(12) United States Patent
Becken et al.

(10) Patent No.: US 8,805,612 B2
(45) Date of Patent: Aug. 12, 2014

(54) METHOD FOR CALCULATION OF THE MAGNIFICATION AND/OR DISTORTION AND METHOD FOR PRODUCTION OF A SPECTACLE LENS WITH LOW MAGNIFICATION AND/OR DISTORTION

(75) Inventors: Wolfgang Becken, Munich (DE); Gregor Esser, Munich (DE); Helmut Altheimer, Baisweil-Lauchdorf (DE); Dietmar Uttenweiler, Munich (DE)

(73) Assignee: Rodenstock GmbH, Munich (DE)

( * ) Notice: Subject to any disclaimer, the term of this patent is extended or adjusted under 35 U.S.C. 154(b) by 1478 days.

(21) Appl. No.: 12/095,639

(22) PCT Filed: Nov. 24, 2006

(86) PCT No.: PCT/EP2006/011301
§ 371 (c)(1),
(2), (4) Date: Apr. 6, 2010

(87) PCT Pub. No.: WO2007/062784
PCT Pub. Date: Jun. 7, 2007

(65) Prior Publication Data
US 2010/0198515 A1    Aug. 5, 2010

(51) Int. Cl.
*G06F 19/00*    (2011.01)
(52) U.S. Cl.
USPC .................. 702/1; 351/159.76; 359/206.01
(58) Field of Classification Search
CPC .................................................. G01V 1/3808
USPC .............................. 702/1; 351/159.76, 159.77
See application file for complete search history.

(56) References Cited

U.S. PATENT DOCUMENTS

| | | | | |
|---|---|---|---|---|
| 5,280,570 A | * | 1/1994 | Jordan | 345/632 |
| 5,926,247 A | * | 7/1999 | Kimura | 351/41 |

(Continued)

FOREIGN PATENT DOCUMENTS

| | | |
|---|---|---|
| DE | 24 39 127 A1 | 2/1975 |
| DE | 30 18 578 A1 | 11/1980 |

(Continued)

OTHER PUBLICATIONS

DE 103 13 275 A1—Englsih translation.*

(Continued)

*Primary Examiner* — John Breene
*Assistant Examiner* — Haihui Zhang
(74) *Attorney, Agent, or Firm* — Crowell & Moring LLP

(57) ABSTRACT

The invention relates to a method for calculation of the local magnification and/or the local distortion of a spectacle lens in at least one predetermined or predeterminable viewing direction, with the spectacle lens being designed to correct a refraction deficit of an eye, and having at least one object-side surface and one second eye-side surface, comprising the following steps: Calculation for the predetermined or predeterminable viewing direction of the profile of a main beam which originates from a predetermined or predeterminable infinitesimally small object and, after refraction by the spectacle lens, passes through the rotation point of the eye, through the entrance pupil of the eye or through the principal plane of the eye; determination of the main curvatures and directions of a local wavefront associated with the main beam on refraction by the spectacle lens; calculation of the local magnification and/or the local distortion of the spectacle lens from the determined main curvatures and directions of the local wavefront, the data relating to the profile of the main beam, and the data relating to the spectacle lens.

21 Claims, 21 Drawing Sheets

(56) References Cited

U.S. PATENT DOCUMENTS

| | | | |
|---|---|---|---|
| 6,095,650 A * | 8/2000 | Gao et al. | 351/227 |
| 6,142,628 A * | 11/2000 | Saigo | 351/204 |
| 6,222,621 B1 * | 4/2001 | Taguchi | 356/124 |
| 6,692,127 B2 * | 2/2004 | Abitbol et al. | 351/227 |
| 6,965,385 B2 * | 11/2005 | Welk et al. | 345/629 |
| 2007/0132945 A1 | 6/2007 | Haser et al. | |

FOREIGN PATENT DOCUMENTS

| | | |
|---|---|---|
| DE | 197 46 229 A1 | 4/1998 |
| DE | 103 13 275 A1 | 10/2004 |
| DE | 10313275 A1 * | 10/2004 |
| EP | 0809126 A1 | 11/1997 |
| JP | 2002-372689 A | 12/2002 |
| JP | 2004-501390 A | 1/2004 |
| WO | 01/81985 A2 | 11/2001 |
| WO | 01/92948 A1 | 12/2001 |
| WO | WO 2004/086125 A1 | 10/2004 |

OTHER PUBLICATIONS

German office action dated Nov. 9, 2006 with partial English translation.
International Preliminary Report dated Jul. 8, 2008 (8 pages).
Internal Search Report with partial English translation.
German office action dated Nov. 9, 2006.
Japanese Office Action with English translation dated Dec. 20, 2011 (eight (8) pages).

* cited by examiner

METHOD FOR CALCULATION OF THE MAGNIFICATION AND/OR DISTORTION AND METHOD FOR PRODUCTION OF A SPECTACLE LENS WITH LOW MAGNIFICATION AND/OR DISTORTION

The invention relates to a method of calculating the local magnification and/or the local distortion of a spectacle lens, to a method of evaluating a spectacle lens as well as to a corresponding computer program product, data carrier and system. The invention also relates to a method of producing a spectacle lens while taking into account the magnification and/or distortion of the spectacle lens and to a corresponding computer program product, a data carrier and a system for producing a spectacle lens.

European Patent Document EP-A-0 809 126 describes a progressive spectacle lens where the differences in the magnification between the near focusing distance and the far focusing distance are to be reduced, the magnification being calculated according to the classical formulas. For this purpose, reference is made to the textbook by Heinz Diepes and Ralf Blendowske "Optik and Technik der Brille" ("Optical and Technical Aspects of Spectacles"), 2002 Edition, Optische Fachveröffentlichung GmbH, Heidelberg, to which reference is also explicitly made with respect to the explanation of all terms not described here in detail.

International Patent Document WO 01/81985 suggests a numerical method for calculating the magnification of a spectacle lens, according to which it becomes possible to calculate the magnification of an arbitrary spectacle lens at an arbitrary point or in an arbitrary viewing direction. According to this numerical method, it is necessary to trace at least one more ray, in addition to the central main beam for the predetermined viewing direction. However, in the field of ophthalmic optics, the ray tracing, as a rule, is a very time-consuming process. This applies particularly when spectacle lens surfaces are not constructed as simple spherical surfaces but as aspherical or progressive surfaces. In this case, ray tracing represents a two-dimensional iteration method.

In the case of asymmetrical surfaces and because of the numerical method, often up to 180 additional beams are necessary, because the magnification is not only a function of the viewing direction but also depends on the alignment of the viewed object. This means that two different main magnifications are present whose values and positions have to be determined at high expenditures even for a single viewing direction. Since there are, for example, more than 5,000 evaluation points or viewing directions in the case of a progressive lens, a very long computing time occurs when this method is used.

When optimizing conventional spectacle lenses, only the refractive index or the refraction errors and the astigmatic errors are taken into account and subsequently minimized. A taking into account of the magnification and of the distortion of a given spectacle lens takes place only by the selection of the base curve or of the depth of curvature of the front face and/or of the back face of the spectacle lens and by the selection of the lens material. However, according to the state of the art, the magnification and the distortion of the spectacle lenses are not taken into account directly or in a targeted manner when optimizing spectacle lenses or when optimizing surfaces.

It is an object of the invention to provide a fast method of calculating the magnification and/or distortion in the case of spectacle lenses or a fast method of evaluating or examining or analyzing a spectacle lens, which, however, permits a precise calculation of the magnification and/or distortion of a spectacle lens.

It is also an object of the invention to provide a method of producing spectacle lenses which leads to an improved tolerance with respect to the spectacle lens and therefore an acceptance of the spectacle lens.

This object is achieved by a method of calculating the local magnification of a spectacle lens having the characteristics of Claim 1, a method of evaluating a spectacle lens having the characteristics of Claim 12, a computer program product having the characteristics of Claim 13, a data carrier having the characteristics of Claim 14, a system for calculating the local magnification of a spectacle lens having the characteristics of Claim 15, a method of producing a spectacle lens having the characteristics of Claim 16, a computer program product having the characteristics of Claim 20, a data carrier having the characteristics of Claim 21 and a system for producing a spectacle lens having the characteristics of Claim 22. Preferred embodiments are defined in the dependent claims.

Before discussing the invention in detail, we will briefly explain the classical formulas for calculating the magnification of a spectacle lens which are used in European Patent Document EP-A-0 809 126. However, as recognized according to the invention, the formulas indicated in European Patent Document EP-A-0 809 126 are not suitable for calculating the magnification of an arbitrary spectacle lens and particularly of a spectacle lens having aspherical surfaces at an arbitrary point.

The magnification $\Gamma$ of a spectacle lens is defined as the quotient of the retinal image size with a spectacle lens to the retinal image size without a spectacle lens. The basis of calculating the magnification according to the state of the art is an afocal centered spectacle lens—eye system, in which a paraxial approximation applies. In this model, the magnification $\Gamma$ of a spectacle lens, which is designed for the correction of a predetermined refraction deficit of an eye, is equal to the total magnification $N_g$ of the afocal system consisting of the fully correcting spectacle lens and the refraction deficit.

The total magnification of the afocal spectacle lens—refraction deficit system is calculated according to the following classical formulas:

$$N_g^{-1} = N_e^{-1} N_s^{-1} \tag{1}$$

The total magnification $N_g$ is composed of:

the shape magnification $N_e$ of an afocal system consisting of an imaginary thick spectacle lens with a center thickness d, a refractive index n and an object-side front surface having a surface power $D_1$; and the system magnification $N_s$ of an afocal system consisting of a thin spectacle lens having a vertex power $S'_\infty$ and the refraction deficit.

The shape magnification $N_e$ and the system magnification $N_s$ are calculated according to the following formulas:

$$N_e^{-1} = 1 - \frac{d}{n} D_1 \tag{2}$$

$$N_S^{-1} = 1 - e S'_\infty \tag{3}$$

The following applies to the vertex power $S'_\infty$ of the imaginary thin spectacle lens:

$$S'_\infty = S_2 + D_2 \tag{4}$$

$$S_2 = N_e D_1 \tag{5}$$

In Formulas (1) to (5), e indicates the effective corneal vertex distance, wherein $$e = HSA + \delta \text{ with } \delta = \begin{cases} 3.05 \text{ mm} \\ 1.35 \text{ mm} \\ 3.85 \text{ mm} \end{cases} \quad (6)$$

depending on the used model.

The modified corneal vertex distance is preferably determined according to the formula: e=HSA+3.05 mm; that is, the modified corneal vertex distance e corresponds essentially to the distance from the image-side vertex of the spectacle lens to the entrance pupil of the eye. However, the modified corneal vertex distance e may be calculated according to other models, for example, as the distance from the image-side vertex of the spectacle lens to the principal plane of the eye (that is, δ=1.35 mm).

Furthermore, $D_i$ indicates the surface power of the i-th surface of the spectacle lens computed according to the formula:

$$D_i = \frac{(n-1)}{2}\left(\frac{1}{r_i^a} + \frac{1}{r_i^b}\right) \quad (7)$$

wherein $r_i^{a,b}$, i=1, 2 are the main curvature radii of the i-th surface of the spectacle lens.

According to the invention, it has been recognized that the classical formulas (1) to (7) for calculating the magnification are not suitable for calculating the magnification of an arbitrary spectacle lens at an arbitrary point of the spectacle lens or in arbitrary viewing directions.

The invention provides a method of calculating the local magnification and/or the local distortion of a spectacle lens in at least one predetermined or predeterminable viewing direction, the spectacle lens being designed for correcting a refractive deficit of an eye and having at least a first object-side surface and a second eye-side surface, comprising the following steps:

Calculating the course of a main beam for the predetermined or predeterminable viewing direction, which main beam originates from a predetermined or predeterminable infinitesimally small object and, after the refraction by the spectacle lens, passes through the rotation point of the eye, through the entrance pupils of the eye or through the principal plane of the eye;

determining the main curvatures and directions of a local wave front associated with the main beam on refraction by the spectacle lens;

calculating the local magnification and/or the local distortion of the spectacle lens from the determined main curvatures and directions of the local wave front, the data relating to the course of the main beam and the data relating to the spectacle lens, when calculating the local magnification and/or the local distortion, a finite distance of the object from the spectacle lens being taken into account.

The data of a spectacle lens comprise particularly data with respect to the refractive index of the spectacle lens, the rise heights of the front face and of the back face of the spectacle lens, from which the local curvatures of the front face and the back face can be derived, and/or the (oblique) thickness of the spectacle lens. The data of the main beam preferably comprise data with respect to the focal length, the angles of incidence and reflection at the respective surface of the spectacle lens, the intersection points of the main beam with the respective surface of the spectacle lens, and/or data with respect to the position of the rotation point of the eye, the entrance pupil and/or the principal plane of the eye. The calculation of the local wave front preferably takes place by wave tracing.

The calculation of the magnification from data of the local wave front, the data of the main beam as well as the data of the spectacle lens takes place analytically without a ray tracing of a second additional ray adjacent to the main beam. In particular, the method of calculating the magnification of a spectacle lens according to the invention is characterized in that only the central main beam still has to be calculated and subsequently the magnification can be calculated from the features of the local wave front. This means that the magnification can be calculated directly from the data of the central main beam with its angles of incidence and reflection at the spectacle lens surfaces, the oblique thickness, the main curvatures and directions of the incoming wave front and/or the main curvatures and directions of the spectacle lens surfaces at the intersection point.

A high-expenditure beam iteration therefore has to be carried out only once for each viewing direction. The computing expenditures can thereby be at least cut in half and, as a rule, can even be reduced by a factor of 500.

The method according to the invention of calculating the local magnification and/or the local distortion of a spectacle lens therefore permits a precise and realistic determination of the actual magnification and distortion characteristics respectively of a spectacle lens while the computing expenditures are simultaneously considerably reduced. By means of the determined data with respect of the magnification and/or distortion of a predetermined spectacle lens, subsequently an evaluation (for example, with respect to the static or dynamic visual impression when looking through the spectacle lens) of the spectacle lens can be carried out. Furthermore, it becomes possible to take into account the received information concerning the actual magnification and/or distortion of a spectacle lens when optimizing the optical characteristics of the spectacle lens, for example, by means of a performance function.

A finite distance of the object from the spectacle lens is preferably taken into account when calculating the local magnification and/or the local distortion.

When calculating the magnification and/or the distortion of the spectacle lens, in addition, average parameters (rotation point of the eye, entrance pupil and/or principal plane, etc.) of a standard eye (such as the so-called Gullstrand eye), a standard use situation (frame piece angle, forward tilt, corneal vertex distance, etc.) and/or a standard object model or standard object distance respectively can be taken into account.

However, in the case of the method according to the invention, the magnification and/or the distortion can be calculated while taking into account individual parameters of the eye of a spectacle wearer, of the individual use situation and/or the individual object distance model. Thus, it becomes possible to take into account the exact impression of the magnification and/or distortion had by the concrete wearer of the spectacles when looking through the spectacle lens.

The data relating to the spectacle lens (thickness, rise heights of the front face and the back face and/or local curvatures) may be theoretical data which refer to the reference spectacle lens with the prescription values required for the correction of the refraction deficit (that is, with the predetermined, spherical, cylindrical, progressive and/or prismatic effects).

However, it is conceivable that the data relative to the spectacle lens are obtained by measuring the rise heights of the front face and/or the back face, for example, by means of scanning devices or an interferometer. The measuring preferably takes place at the points of a grid which are situated at a predetermined distance. The complete surface can then, for example, be reconstructed by means of spline functions. As a result, it becomes possible that any manufacturing-related deviations of the rise heights can also be taken into account during the calculation of the magnification and/or distortion.

The first and the second surface of the spectacle lens may be rotationally symmetrical and preferably spherical surfaces.

However, at least one of the surfaces of the spectacle lens may be a rotationally asymmetrical surface. The at least one rotationally asymmetrical surface may, for example, be
- a progressive surface with a continuously changing refractive power between a far and a near reference point; or
- an aspherical or atoric surface.

The calculation of the local magnification and/or of the local distortion can take place by paraxial approximation. However, when calculating the local magnification and/or the local distortion, a non-paraxial course of the main beam can be taken into account.

The calculation step and/or the optimization step preferably comprises the calculation of a local magnification matrix $N_g$ from the characteristics of the local wave front. The magnification of the spectacle lens can be calculated as the average value of the Eigenvalues of the magnification matrix $N_g$ and the distortion as the difference between the Eigenvalues of the magnification matrix $N_g$.

By paraxial approximation, the local magnification matrix $N_g$ can be calculated according to the following formulas, the individual local factors or quantities always being evaluated at the intersection points of the main beam with the respective surface of the spectacle lens:

$$N_g^{-1} = \sigma \cdot N_e^{-1} N_s^{-1}$$

$$N_e^{-1} = 1 - \frac{d}{n} S_1'$$

$$N_s^{-1} = 1 - e S_2'$$

$$S_2' = S_2 + D_2$$

$$S_2 = N_e S_1'$$

$$S_1' = S_1 + D_1$$

$$S_1 = \frac{1}{s_1} 1$$

wherein:

$\sigma$ indicates a scaling factor for taking into account a finite focal length $s_1$ calculated according to the formula:

$$\sigma = \frac{|s_1|}{|s_1 + d + e|};$$

$s_1$ indicates a vector of a length $s_1$ in the light direction of the object-side main beam between the object viewed in the predetermined viewing direction and the intersection point of the main beam with the first surface;

d indicates a vector of the length d in the light direction of the main beam between the intersection point of the main beam HS with the first surface and the intersection point of the main beam with the second surface;

e indicates a vector of a length e in the light direction of the image-side main beam HS between the intersection point of the main beam with the second surface and the entrance pupil of the eye, the point of rotation of the eye or the principal plane of the eye;

$N_e^{-1}$ indicates the local inverse matrix of the shape magnification;

$N_s^{-1}$ indicates the local inverse matrix of the system magnification;

$S_1$ indicates the local curvature or vergency matrix of the incident spherical wave front on the first surface of the spectacle lens;

$S_i'$, i=1, 2 indicates the local curvature or vergency matrix of the wave front after the refraction on the i-th surface of the spectacle lens; and $S_2$ indicates the local surface or vergency matrix of the wave front incident on the second eye-side surface of the spectacle lens;

$D_i$, i=1, 2 indicates the local surface power matrix of the i-th surface of the spectacle lens which is calculated according to the following formulas:

$$D_i = \begin{pmatrix} Sph_i - \frac{Zyl_i}{2}\cos 2\psi i & -\frac{Zyl_i}{2}\sin 2\psi i \\ -\frac{Zyl_i}{2}\sin 2\psi i & Sph_i + \frac{Zyl_i}{2}\cos 2\psi i \end{pmatrix}$$

$$Sph_i = \frac{(n-1)}{2}\left(\frac{1}{r_i^a} + \frac{1}{r_i^b}\right)$$

$$Zyl_i = \frac{(n-1)}{2}\left(\frac{1}{r_i^a} - \frac{1}{r_i^b}\right), \ i = 1, 2;$$

wherein $r_i^{a,b}$, i=1, 2 indicate the local main curvature radii of the i-th surface in the respective intersection point of the main beam with the i-th surface of the spectacle lens; and $\Psi_i$ indicates the angle between the normal vector $p_i$ of the refraction plane at the i-th surface and the direction $q_i$ in which the more curved main section extends.

The vector e corresponds to the effective corneal vertex distance e which is entered in the calculation of the magnification according to classical Formulas 1 to 5. Depending on the used model of the magnification (angular field magnification, visual angle magnification, etc.), the vector e may be a vector between the intersection point of the main beam with the second surface and the entrance pupil of the eye (for example, in the case of the visual angle magnification), the point of rotation of the eye (for example, in the case of the angular field magnification) or the principal plane of the eye.

By paraxial approximation while assuming rotationally symmetrical surfaces, the local magnification matrix $N_g$, the inverse matrix of the shape magnification $N_e^{-1}$, the inverse matrix of the system magnification $N_s^{-1}$, the local curvature or vergency matrix of the incident spherical wave front $S_1$ on the first surface of the spectacle lens, the local curvature or vergency matrix of the wave front after the refraction at the i-th surface of the spectacle lens $S_i'$, i=1, 2 and the curvature or vergency matrix $S_2$ of the wave front incident on the second eye-side surface of the spectacle lens can be represented as proportional to the unit matrix 1 and therefore as a scalar quantity.

However, the above formulas can be further expanded so that, in addition to a finite focal length $s_1$ and arbitrary aspherical surfaces of the spectacle lens, an arbitrary course of the main beam (that is, arbitrary angles of incidence and reflection) is taken into account.

In this general case, the magnification matrix $N_g$ can be calculated according to the following formulas, the individual local factors or quantities always being evaluated at the intersection points of the main beam with the respective surface of the spectacle lens;

$$N_g^{-1} = \sigma \cdot R_1^{-1} T_1^{-1} N_e^{-1} R_{12} T_2^{-1} N_s^{-1} R_2$$

$$N_e^{-1} = 1 - \frac{d}{n} S_1'$$

$$N_s^{-1} = 1 - e S_2',$$

wherein $\sigma$ indicates a scaling factor for taking into account a finite focal length $s_1$ according to the formula:

$$\sigma = \frac{|s_1|}{|s_1 + d + e|};$$

$s_1$ indicates a vector of the length $s_1$ in the light direction of the object-side main beam between the object viewed in a predetermined viewing direction and the intersection point of the main beam with the first surface;

d indicates a vector of the length $d_1$ in the light direction of the main beam between the intersection point of the main beam HS with the first surface and the intersection point of the main beam with the second surface;

e indicates a vector having a length e in the light direction of the image-side main beam between the intersection point of the main beam with the second surface and the entrance pupil of the eye, the point of rotation of the eye or the principal plane of the eye;

n indicates the refractive index of the spectacle lens;

$N_e^{-1}$ indicates the local inverse matrix of the inherent magnification;

$N_s^{-1}$ indicates the local inverse matrix of the system magnification;

and wherein:

| | |
|---|---|
| $R_1 = R(\phi_1) = \begin{pmatrix} \cos\phi_1 & -\sin\phi_1 \\ \sin\phi_1 & \cos\phi_1 \end{pmatrix}$ | indicates the 2 × 2 rotation matrix within the plane perpendicular to the object-side main beam s from the system of the first surface, defined by the normal vector $p_1$ perpendicular to the plane of refraction at the first surface, onto a suitable reference direction defined by the reference direction vector $p_0$; |
| $\phi_1$ | indicates the angle between the normal vector $p_1$ and the reference direction vector $p_0$; |
| $R_2 = R(\phi_2) = \begin{pmatrix} \cos\phi_2 & -\sin\phi_2 \\ \sin\phi_2 & \cos\phi_2 \end{pmatrix}$ | indicates the 2 × 2 rotation matrix within the plane perpendicular to the object-side main beam e from the system of the second surface, defined by the normal vector $p_2$ perpendicular to the plane of refraction at the second surface, onto a suitable reference direction $p_0$; |
| $\phi_2$ | indicates the angle between the normal vector $p_2$ and the reference direction vector $p_0$; |
| $R_{12} = R(\phi_{12}) = \begin{pmatrix} \cos\phi_{12} & -\sin\phi_{12} \\ \sin\phi_{12} & \cos\phi_{12} \end{pmatrix}$ | indicates the 2 × 2 rotation matrix within the plane perpendicular to the main beam d between the surfaces of the spectacle lens, which transforms the normal vector $p_1$ into the normal vector $p_2$; |
| $\phi_{12}$ | indicates the angle between the normal vectors $p_1$ and $p_2$; |
| $T_i = C_i C_i'^{-1}, i = 1, 2$ $C_i = \begin{pmatrix} \cos\alpha_i & 0 \\ 0 & 1 \end{pmatrix}, i = 1, 2$ $C_i' = \begin{pmatrix} \cos\alpha_i' & 0 \\ 0 & 1 \end{pmatrix}, i = 1, 2$ | indicate the 2 × 2 slope matrices for taking into account the influence of a oblique incidence of the main beam at the i-th surface of the spectacle lens on the magnification; |
| $\alpha_i$ | indicates the incidence angle at the i-th surface, defined as the angle between the vector along main beam incident on the i-th surface of the spectacle lens and the normal vector $n_i$, i = 1, 2 perpendicular to the i-th surface; |
| $\alpha_i'$ | indicates the angle of reflection at the i-th surface of the spectacle lens, defined as the angle between the vector along the main beam emerging from the i-th surface and the normal vector $n_i$, i = 1, 2 perpendicular to the i-th surface; |
| $S_1 = \frac{1}{s_1} 1$ | indicates the curvature or vergency matrix of the spherical wave front incident on the first surface; |
| $S_i' = T_i S_i T_i + \tilde{D}_i$ | indicates the local curvature or vergency matrices of the wave fronts after the refraction at the i-th surface of the spectacle lens, calculated according to the law of refraction while taking into account the oblique angle of incidence of the main beam; |
| $S_2 = R_{12}^{-1} N_e S_1' R_{12}$ | indicates the local curvature or vergency matrix of the wave front incident on the second surface, which is calculated after the transfer from the first surface; |
| $\tilde{D}_i = v_i C_i'^{-1} D_i C_i'^{-1}$ | indicates the corrected local surface power matrix of the i-th surface of the spectacle lens, which takes into account a non-paraxial incidence of the wave front; |
| $D_i = \begin{pmatrix} Sph_i - \frac{Zyl_i}{2}\cos 2\psi_i & -\frac{Zyl_i}{2}\sin 2\psi_i \\ -\frac{Zyl_i}{2}\sin 2\psi_i & Sph_i + \frac{Zyl_i}{2}\cos 2\psi_i \end{pmatrix}$ | indicates the local surface power matrix of the i-th surface of the spectacle lens; |
| $\psi_i$ | indicates the angle between the normal vector $p_i$ of the refraction plane at the i-th surface of the spectacle lens and the direction $q_i$ into which the more curved main section extends; |

-continued

| | |
|---|---|
| $Sph_i = \frac{(n-1)}{2}\left(\frac{1}{r_i^a} + \frac{1}{r_i^b}\right), i = 1, 2$ | indicates the spherical equivalent of the i-th surface of the spectacle lens; |
| $Zyl_i = \frac{(n-1)}{2}\left(\frac{1}{r_i^a} - \frac{1}{r_i^b}\right), i = 1, 2$ | indicates the cylinder of the i-th surface of the spectacle lens; |
| $r_i^{a,b}, i = 1, 2$ | indicates the main curvature radii of the i-th surface of the spectacle lens; |
| $v_1 = \frac{n\cos\alpha_1' - \cos\alpha_1}{n-1}$ | indicates the correction factor for taking into account the oblique angle of incidence of the main beam at the first surface; |
| $v_2 = \frac{\cos\alpha_2' - n\cos\alpha_2}{1-n}$ | indicates the correction factor for taking into account the oblique angle of incidence of the main beam at the second surface. |

The calculation of the local magnification and/or distortion of the spectacle lens can be carried out for a plurality of predetermined or predeterminable viewing directions. This preferably results in an exact distribution of the local magnification and/or distortion of the entire spectacle lens.

Furthermore, according to the invention, a method is provided for evaluating or examining or analyzing a spectacle lens which comprises the steps of:
  collecting data relating to the spectacle lens, particularly data concerning the thickness, the rising height of the front face and the back face of the spectacle lens and/or the local curvatures of the front face and back face of the spectacle lens;
  calculating the local magnification and/or the distortion of the spectacle lens according to the above-described method of calculating the local magnification and/or local distortion of a spectacle lens.

The method of evaluating a spectacle lens preferably also comprises a visualizing step, in which the distribution of the calculated local magnification and/or distortion of the spectacle lens is visualized, for example, by means of isolines or color coding.

The evaluating method according to the invention, in a precise manner and without any high computing expenditures, permits the distribution of the actual local magnification and/or the local distortion over the entire surface of the spectacle lens to be examined including the periphery. The calculation of the local magnification and/or distortion characteristics of the spectacle lens can therefore take place in real time and online respectively. Since the actual magnification and distortion characteristics respectively of the spectacle lens to be examined are taken into account, it is also possible to carry out a more precise and more realistic evaluation of the spectacle lens, particularly a more precise evaluation of the actual static and/or dynamic visual impression when looking through the spectacle lens and thereby of the tolerance and the acceptance of the spectacle lens by the wearer of the spectacles.

According to the invention, a computer program product is provided which is designed, when loaded and executed on a computer, for implementing the above-described method of calculating the local magnification and/or the local distortion of a spectacle lens and the method of evaluating or examining or analyzing a spectacle lens.

Furthermore, a data carrier is provided according to the invention on which a computer program is stored, which is designed, when loaded and executed on a computer, for implementing the above-described method of calculating the local magnification and/or the local distortion of a spectacle lens and the method of evaluating or examining or analyzing a spectacle lens.

According to the invention, a system is further suggested which is designed for implementing the above-described method of calculating the local magnification and/or distortion of a spectacle lens and the above-described method of evaluating or examining or analyzing a spectacle lens while taking into account the local magnification and/or distortion of the spectacle lens. The system according to the invention for calculating the local magnification and/or the local distortion of a spectacle lens in at least one predetermined or predeterminable viewing direction, the spectacle lens being designed for correcting a refraction deficit of an eye and having at least a first object-side surface and a second eye-side surface, comprises:
  Collecting devices for the collection of data relative to the spectacle lens;
  calculating devices for calculating by means of the data relative to the spectacle lens the course of a main beam for the predetermined or predeterminable viewing direction, the main beam originating from a predetermined or predeterminable infinitesimally small object and, after the refraction by the spectacle lens, extending through the rotation point of the eye, through the entrance pupil of the eye or through the principal plane of the eye;
  calculating devices for calculating the main curvatures and directions of a local wave front pertaining to the main beam during the refraction by the spectacle lens;
  calculating devices for calculating the local magnification and/or the local distortion of the spectacle lens from the determined main curvatures and directions of the local wave front, the data of the course of the main beam and the data relative to the spectacle lens.

According to the invention, a method is also suggested for producing a spectacle lens while taking into account the magnification and/or the distortion of the spectacle lens, the spectacle lens being designed for the correction of a refraction deficit of an eye and at least having a first object-side surface and a second eye-side surface, the method comprising a calculation or optimization step which takes place such that a performance function F is minimized, wherein $$\min F = \min\left(\sum_i G_{V,i}(N_{actual}(i) - N_{des}(i))^2 + G_{Z,i}(Z_{actual}(i) - Z_{des}(i))^2\right),$$

and wherein
$N_{actual}(i)$ indicates the actual magnification of the spectacle lens at the i-th evaluation point;
$N_{des}(i)$ indicates the desired magnification of the spectacle lens at the i-th evaluation point;
$G_{v,i}$ indicates the weighting of the magnification of the spectacle lens at the i-th evaluation point;
$Z_{actual}(i)$ indicates the actual distortion of the spectacle lens at the i-th evaluation point;
$Z_{des}(i)$ indicates the desired distortion at the i-th evaluation point;
$G_{z,i}$ indicates the weighting of the distortion at the i-th evaluation point.

The i-th evaluation point relates to the respective intersection point of the respective main beam with the front face or back face of the spectacle lens. The index I is used for indicating the various main beams which, in the case of an optimization, are successively used for calculating the performance function.

As explained above, when optimizing conventional spectacle lenses or when optimizing the surfaces of the front and back faces of conventional spectacle lenses, only the power or the refraction errors and the astigmatic errors are taken into account and are subsequently minimized. A taking into account of the magnification and of the distortion of a predetermined spectacle lens takes place only by the selection of the basic curve or the bending of the front face and/or the back face of the spectacle lens and by the selection of the lens material. However, according to the state of the art, the magnification and the distortion of the spectacle lenses is not taken into account directly or in a targeted manner when optimizing the spectacle lenses or when optimizing the surfaces.

However, for the imaging through the spectacle lens and creating the retinal image, the magnification and the distortion play a decisive role: They quantify the dimensional changes of an object when looking through the spectacle lens. While the dimension of the astigmatic error represents a measurement for the impairment of the definition, the distortion is the measurement for the similarity of the object and the image. Large distortion differences between the left and the right spectacle lens disturb the binocular fusion (merger) of the two retinal images in the brain because the images in the left and the right eye are no longer similar geometrically. The result may be spatial falsifications, asthenopic complaints possibly as serious as double images, and thus a complete rejection of the spectacles. A significant change of the magnification and particularly of the distortion within the spectacle lens is also undesirable because, during viewing motions (direct seeing) as well as during head motions (indirect seeing), it results in considerable impairments of sight.

According to the invention, an optimization method is suggested whereby the magnification and/or the distortion are taken into account directly during the optimization of the spectacle lens or during the surface optimization of the front face and/or of the back face of the spectacle lens by minimizing a predetermined performance function. A spectacle lens can thereby be obtained which has minimal magnification differences between a central region of the spectacle lens and the peripheral region or between the far and near part in the case of progressive spectacle lenses, etc. As a result, the tolerance and the acceptance of the spectacle lens are considerably improved.

The spectacle lenses or spectacle lens surfaces optimized according to the above-described optimization method according to the invention while taking into account the magnification and/or distortion may be produced, for example, by means of numerically controlled tools, from mineral glass or plastic material.

Preferably, the weighting $G_{v,i}$ of the magnification and/or the weighting $G_{z,i}$ of the distortion are equal to 1. Furthermore, the desired values $N_{des}(i)$ and $Z_{des}(1)$ of the magnification and the distortion are preferably equal to zero. Surprisingly, it was found that, although only one of the magnification or distortion parameters is taken into account when optimizing the spectacle lens, the distribution of the other parameter, which is not taken into account, is also considerably improved.

When the magnification and/or the distortion are to be included as sole or as additional parameters in the performance function during the optimization, the computing time plays a decisive role. This applies particularly to individual spectacle lenses, where the aspherical surface has to be optimized and calculated on-line to order. In this case, the computing time should maximally only be one to a few minutes. The magnification and/or the distortion at the i-th evaluating point of the spectacle lens are therefore preferably computed according to the above-described method of calculating the local magnification and/or the local distortion of the spectacle lens.

Also preferably, the calculation or optimization step takes place such that, in addition, the refraction errors and/or the astigmatic errors of the spectacle lens are minimized.

According to the invention, a computer program product is provided which is designed, when loaded and executed on a computer, for implementing the above-described method of optimizing a spectacle lens while taking into account the magnification and/or the distortion of the spectacle lens, the method for the optimization of the spectacle lens comprising a calculation or optimization step which takes place such that the performance function F is minimized:

$$\min F = \min\left(\sum_i G_{V,i}(N_{actual}(i) - N_{des}(i))^2 + G_{Z,i}(Z_{actual}(i) - Z_{des}(i))^2\right),$$

wherein:
$N_{actual}(i)$ indicates the actual magnification of the spectacle lens at the i-th evaluation point;
$N_{des}(i)$ indicates the desired magnification of the spectacle lens at the i-th evaluation point;
$G_{v,i}$ indicates the weighting of the magnification of the spectacle lens at the i-th evaluation point;
$Z_{actual}(i)$ indicates the actual distortion of the spectacle lens at the i-th evaluation point;
$Z_{des}(i)$ indicates the desired distortion at the i-th evaluation point;
$G_{z,i}$ indicates the weighting of the distortion at the i-th evaluation point.

Furthermore, according to the invention, a data carrier medium is provided on which a computer program is stored, the computer program being designed, when loaded and implemented on a computer, for implementing the above described method of optimizing a spectacle lens while taking into account the magnification and/or the distortion of the spectacle lens, the method of optimizing the spectacle lens comprising a calculation or optimization step, the calculation or optimization step taking place such that a performance function F is minimized, wherein $$\min F = \min\left(\sum_i G_{V,i}(N_{actual}(i) - N_{des}(i))^2 + G_{Z,i}(Z_{actual}(i) - Z_{des}(i))^2\right),$$

and wherein:
$N_{actual}(i)$ indicates the actual magnification of the spectacle lens at the i-th evaluation point;
$N_{des}(i)$ indicates the desired magnification of the spectacle lens at the i-th evaluation point;
$G_{v,i}$ indicates the weighting of the magnification of the spectacle lens at the i-th evaluation point;
$Z_{actual}(i)$ indicates the actual distortion of the spectacle lens at the i-th evaluation point;
$Z_{des}(i)$ indicates the desired distortion at the i-th evaluation point;
$G_{z,i}$ indicates the weighting of the distortion at the i-th evaluation point.

According to the invention, a system is also suggested which is designed for implementing the above-described method of producing a spectacle lens while taking into account the magnification and/or the distortion of the spectacle lens. The system according to the invention for producing a spectacle lens while taking into account the magnification and/or the distortion of the spectacle lens, which is designed for correcting a refraction deficit of an eye and has at least a first object-side and a second eye-side surface, comprises:

Collecting devices for collecting target data of a spectacle lens;

calculating and optimizing devices for calculating and optimizing at least one surface of the spectacle lens, the calculation and optimization respectively taking place such that a performance function F is minimized:

$$\min F = \min\left(\sum_i G_{V,i}(N_{actual}(i) - N_{des}(i))^2 + G_{Z,i}(Z_{actual}(i) - Z_{des}(i))^2\right),$$

wherein:

$N_{actual}(i)$ indicates the actual magnification of the spectacle lens at the i-th evaluation point;

$N_{des}(i)$ indicates the desired magnification of the spectacle lens at the i-th evaluation point;

$G_{v,i}$ indicates the weighting of the magnification of the spectacle lens at the i-th evaluation point;

$Z_{actual}(i)$ indicates the actual distortion of the spectacle lens at the i-th evaluation point;

$Z_{des}(i)$ indicates the desired distortion at the i-th evaluation point;

$G_{z,i}$ indicates the weighting of the distortion at the i-th evaluation point.

Target data of a spectacle lens are particularly the desired prescription data of the spectacle lens designed for correcting a refraction deficit of an eye. The prescription data of a spectacle lens therefore comprise the desired spherical, cylindrical, prismatic and/or progressive effect of the spectacle lens. Furthermore, the target data of the spectacle lens may comprise particularly the refractive index, the bending of the front and/or back face; and/or the center thickness. The target data of the spectacle lens may also comprise data with respect to the arrangement of the spectacle lens in front of the spectacle wearer's eye or data with respect to the usage situation. The usage situation can be characterized particularly by the side tilt and forward tilt of the spectacle lens, the corneal vertex distance, etc. Likewise, the target data of the spectacle lens may comprise data with respect to the model of the object space to be viewed or concerning the object distance.

The usage situation may be an average usage situation or a usage situation determined individually for a certain spectacle wearer. The model of the object space to be viewed may also be an average model or a model individually defined for a certain spectacle wearer, for example, as a function of the seeing task.

The calculation of the magnification and/or the distortion of the spectacle lens preferably takes place according to the above-described methods of calculating the local magnification and/or distortion of the spectacle lens.

In the following, the invention will be described as an example by means of embodiments with reference to the drawings.

Figure 10A:
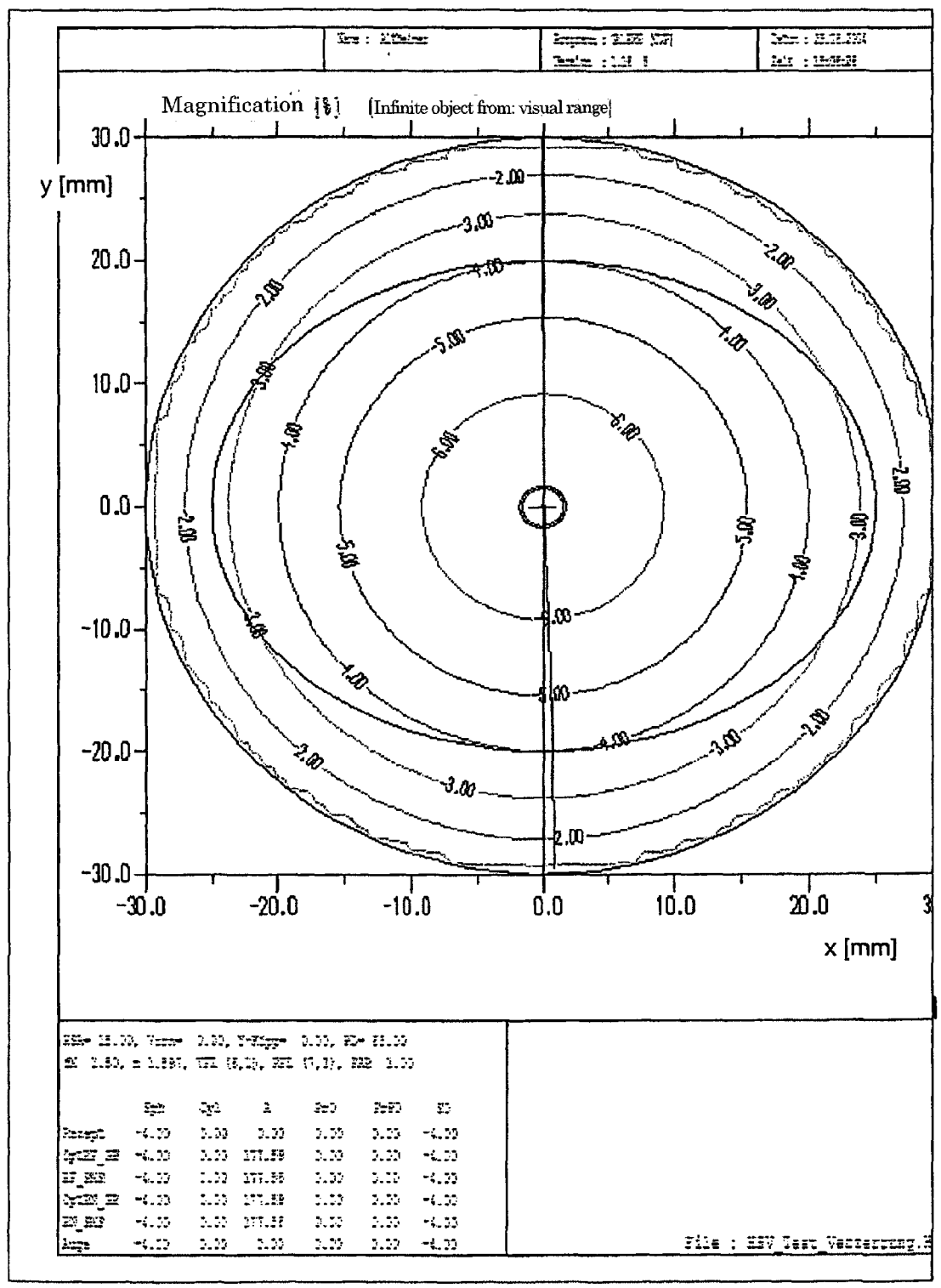
Figure 10B:
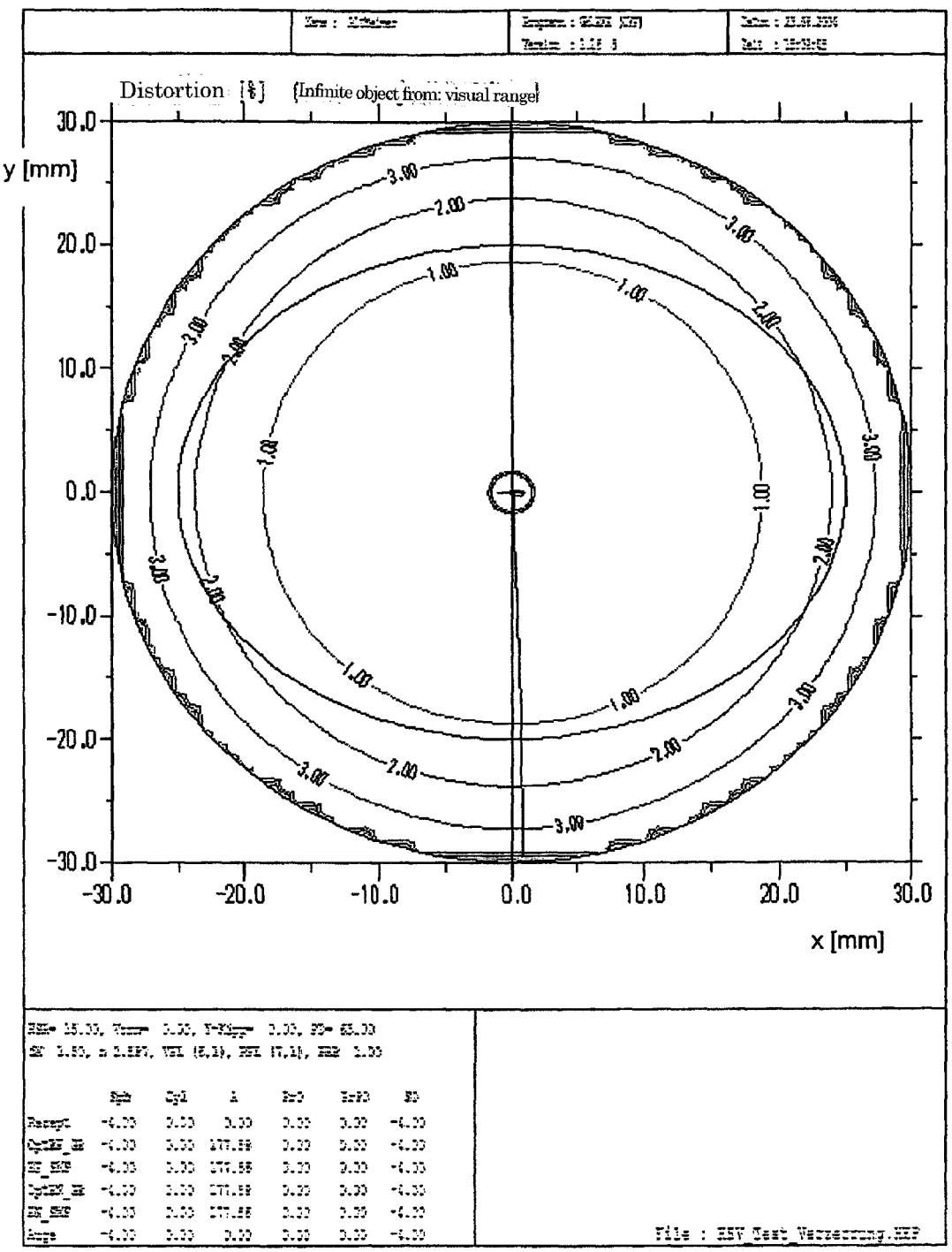
Figure 10C:
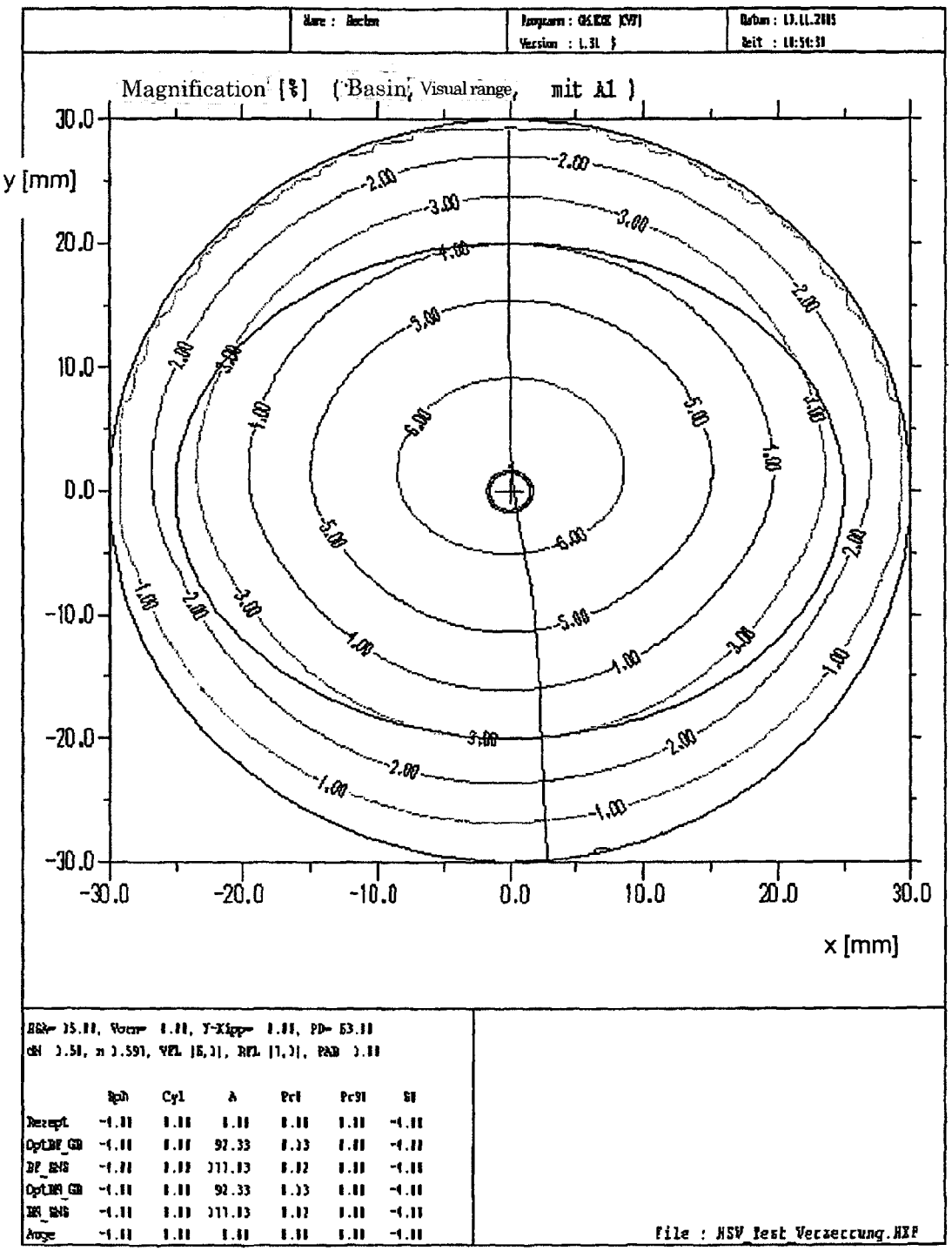
Figure 11A:
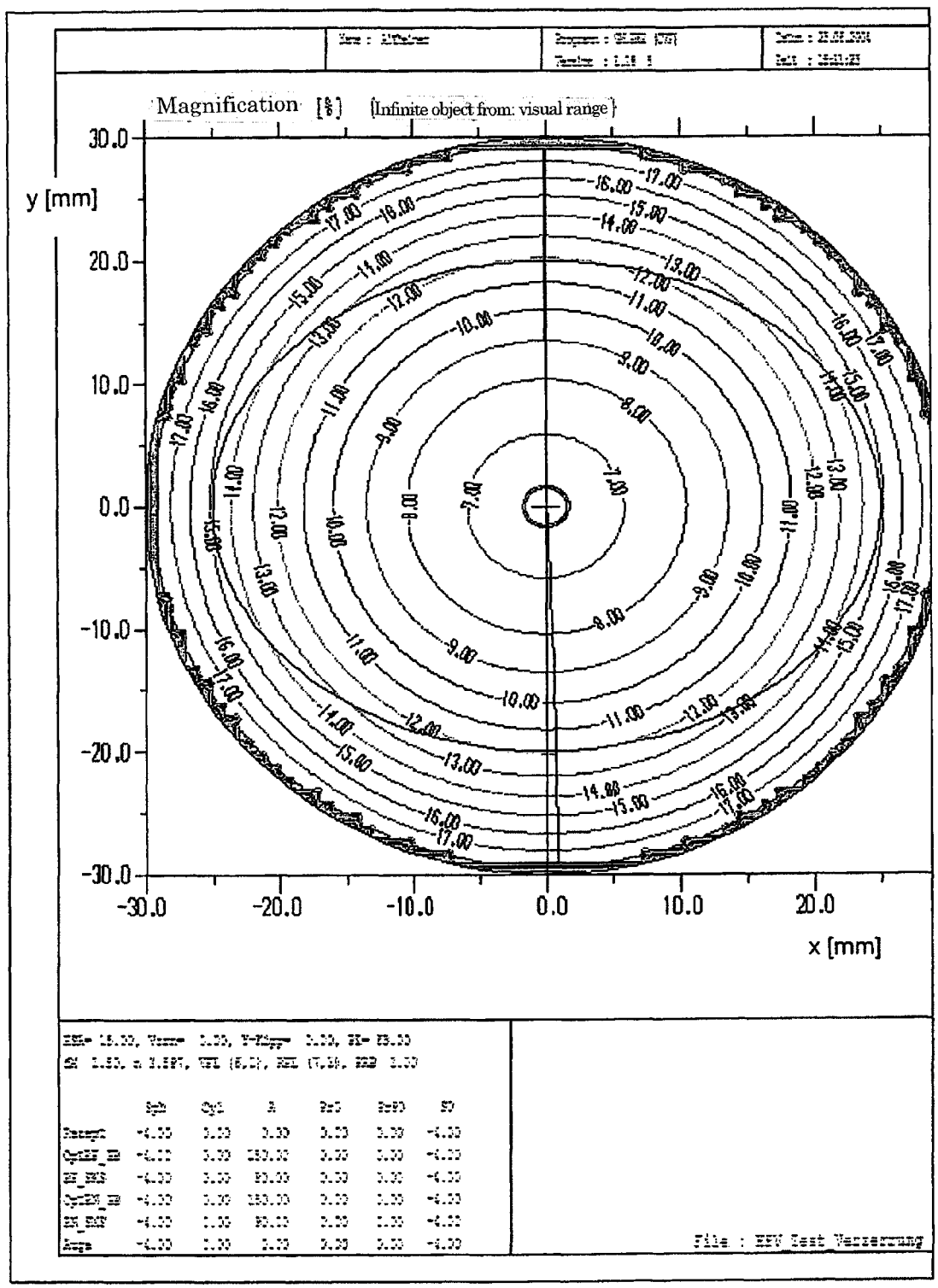
Figure 12A:
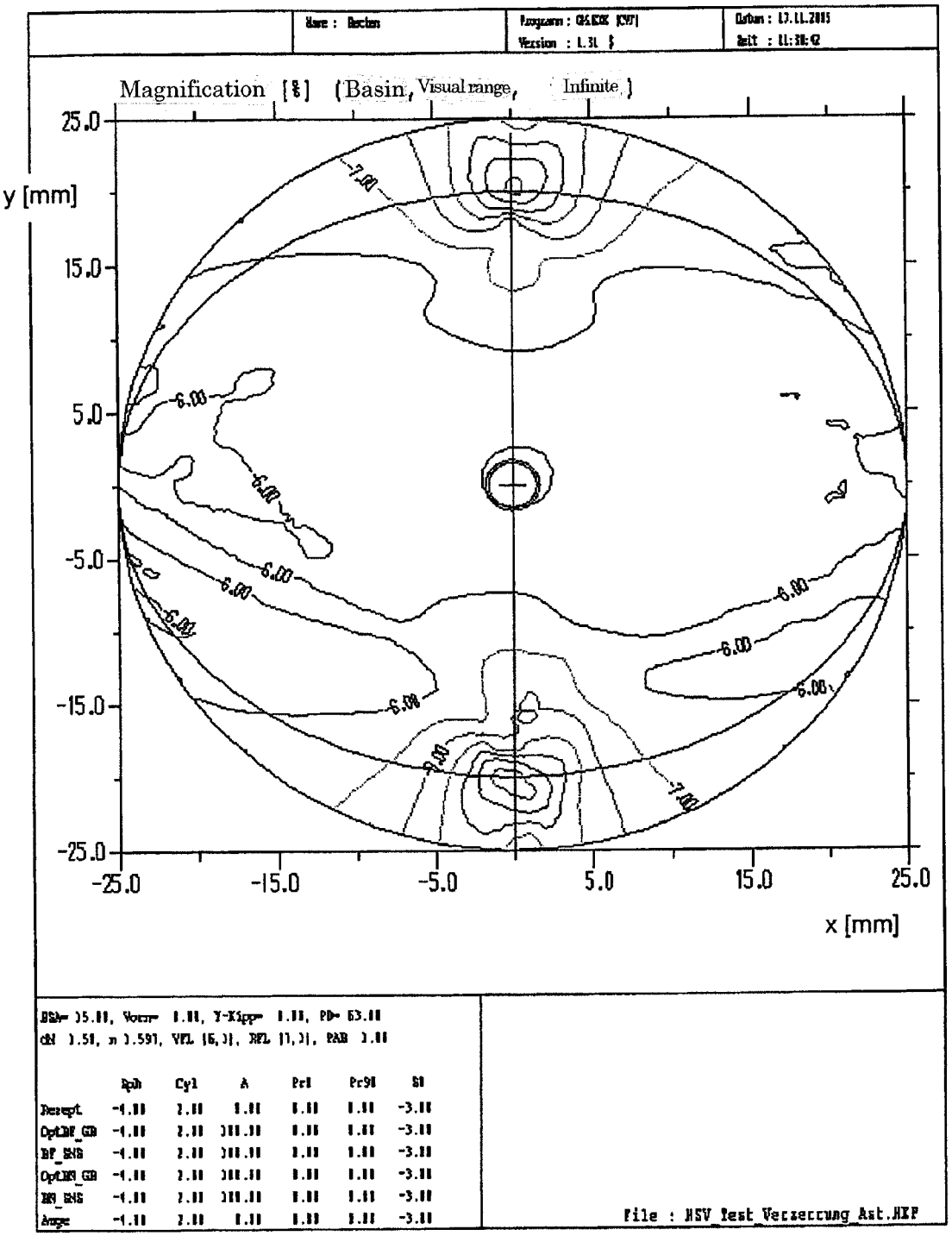
Figure 12B:
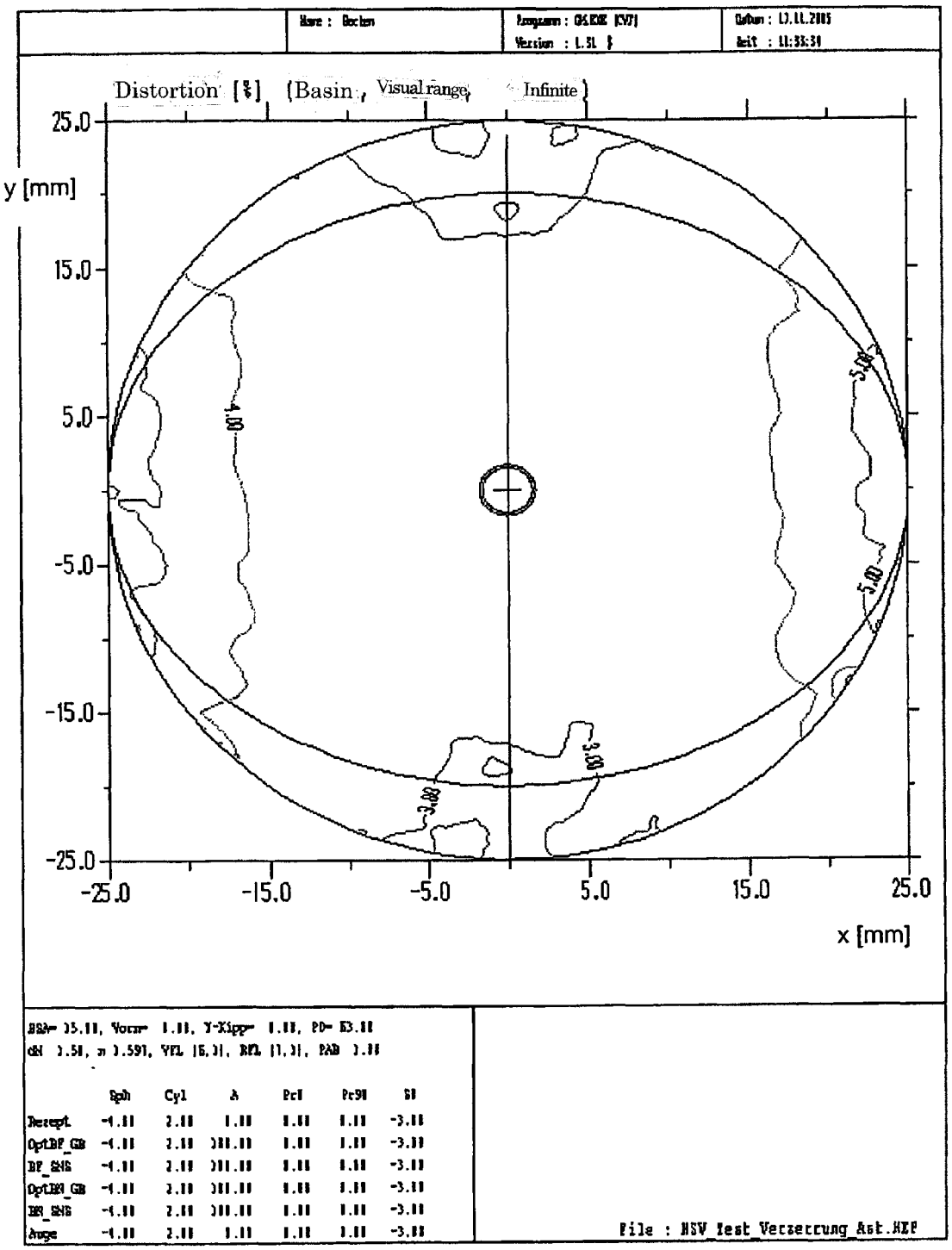
Figure 12C:
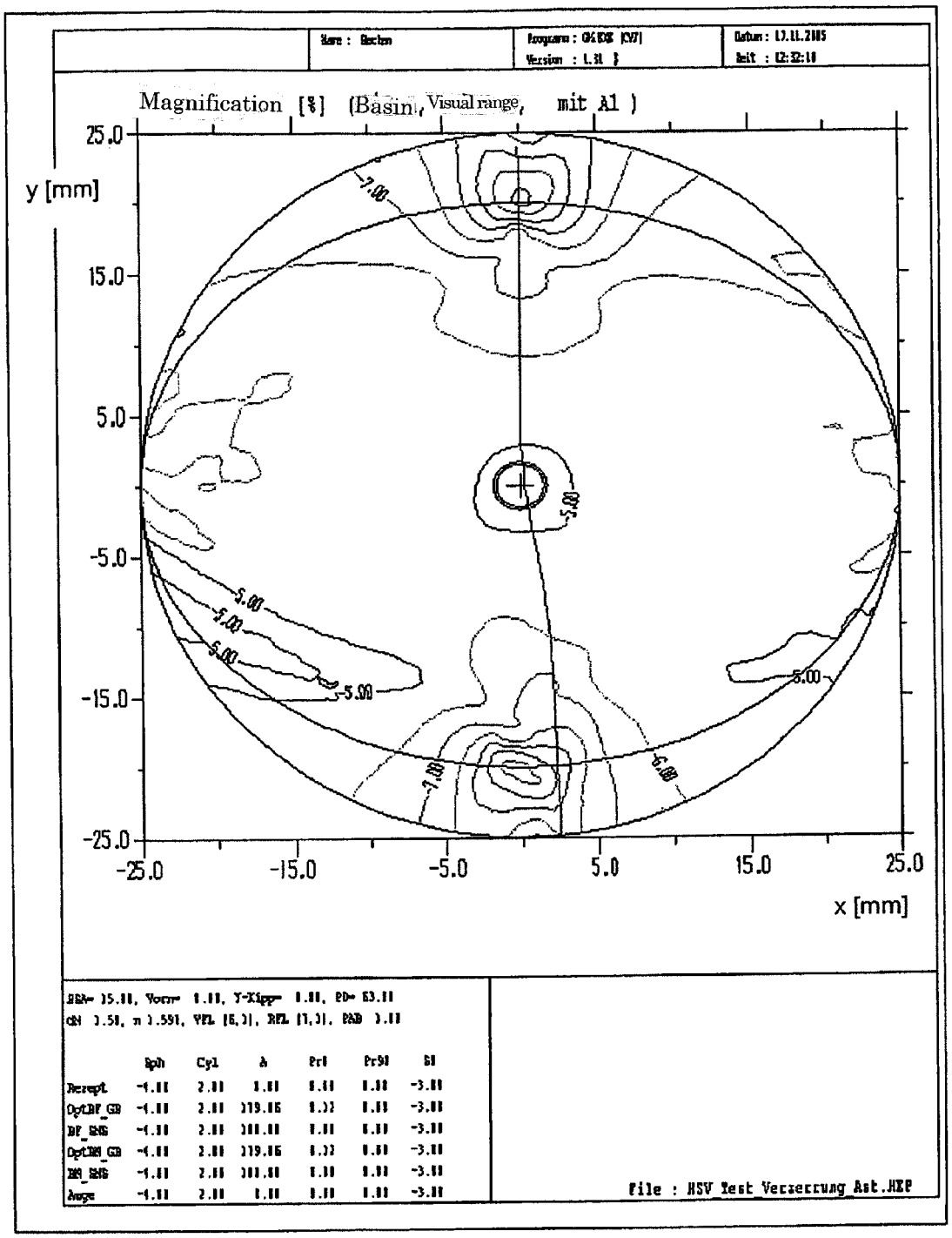
Figure 12D:
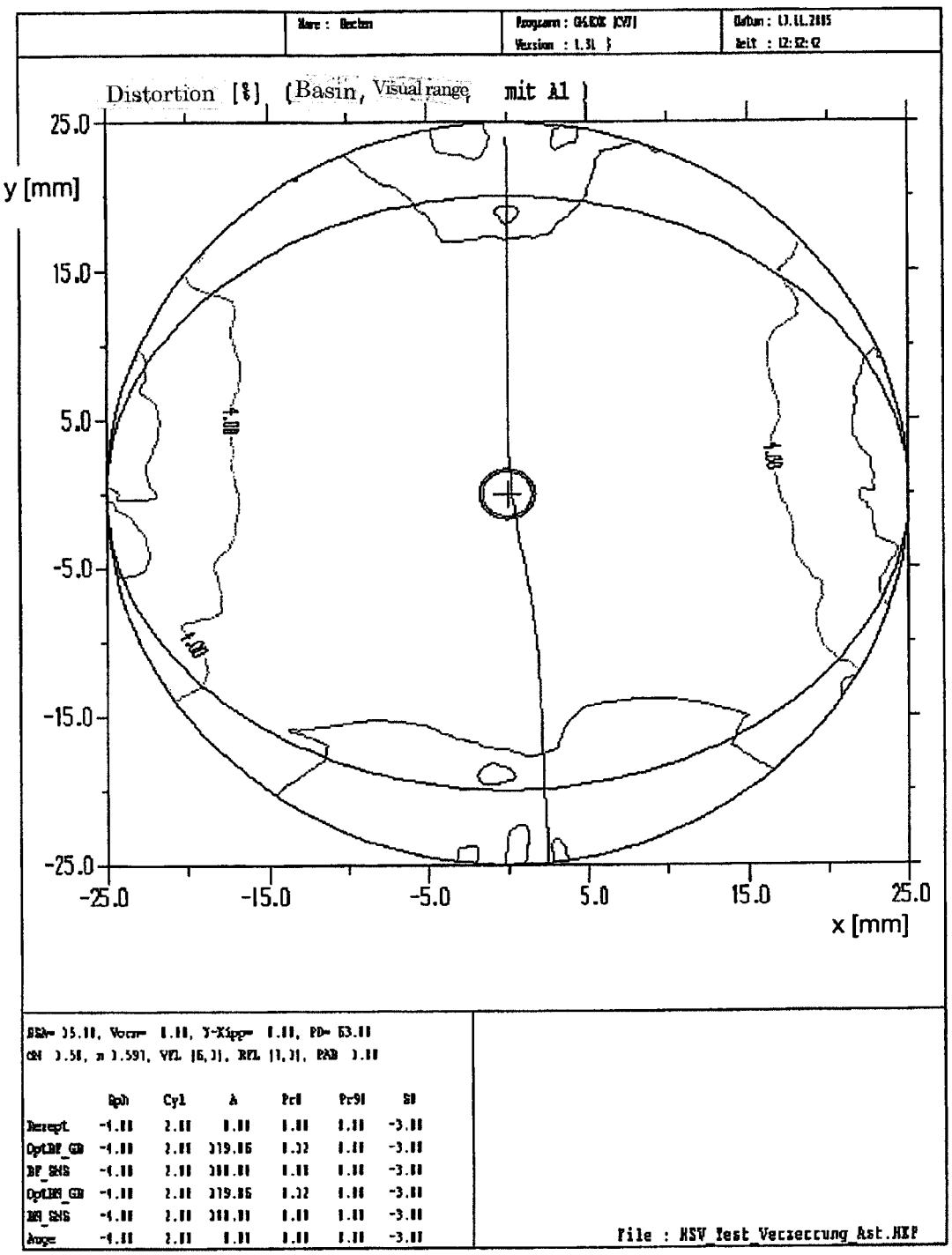
Figure 13A:
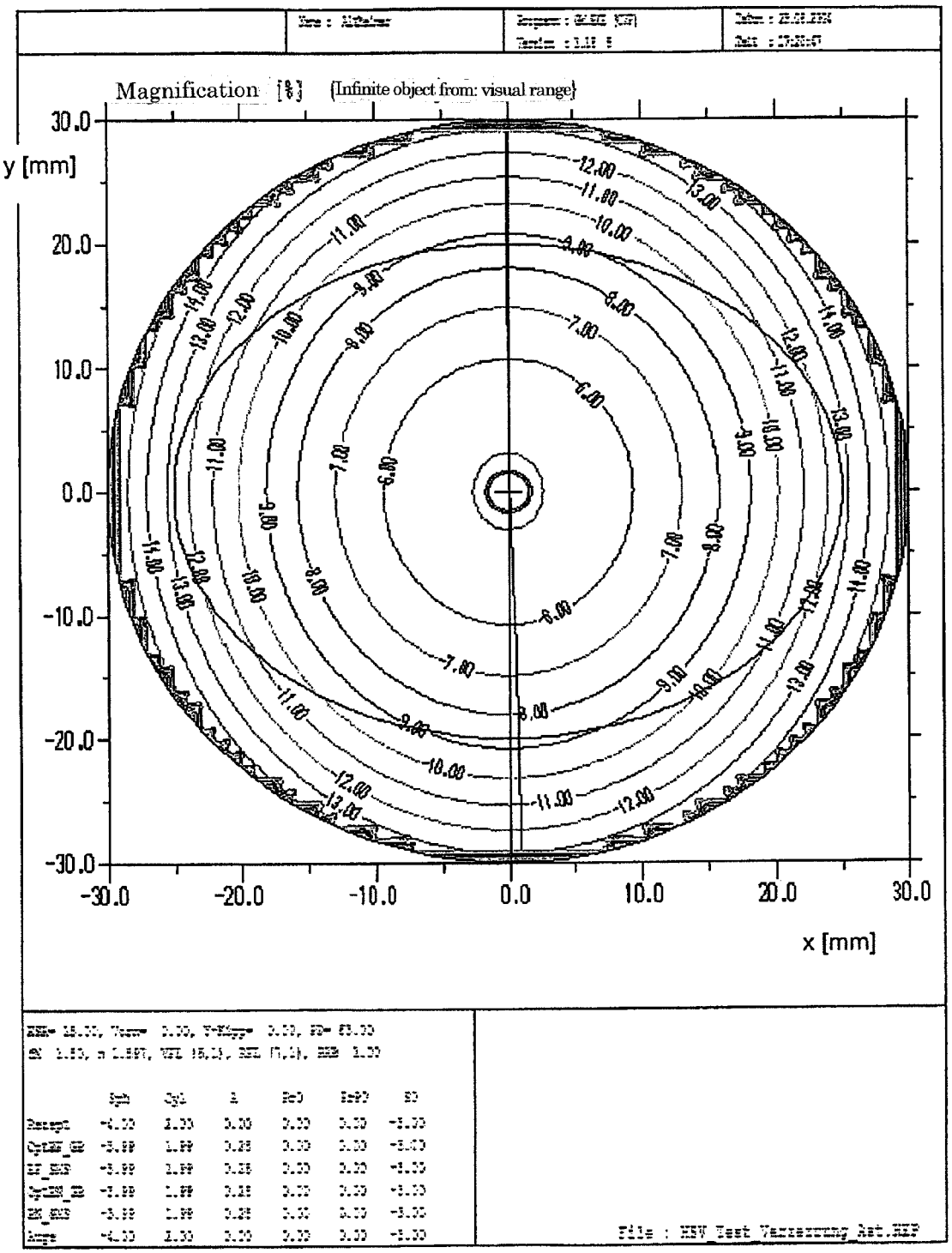
Figure 14:
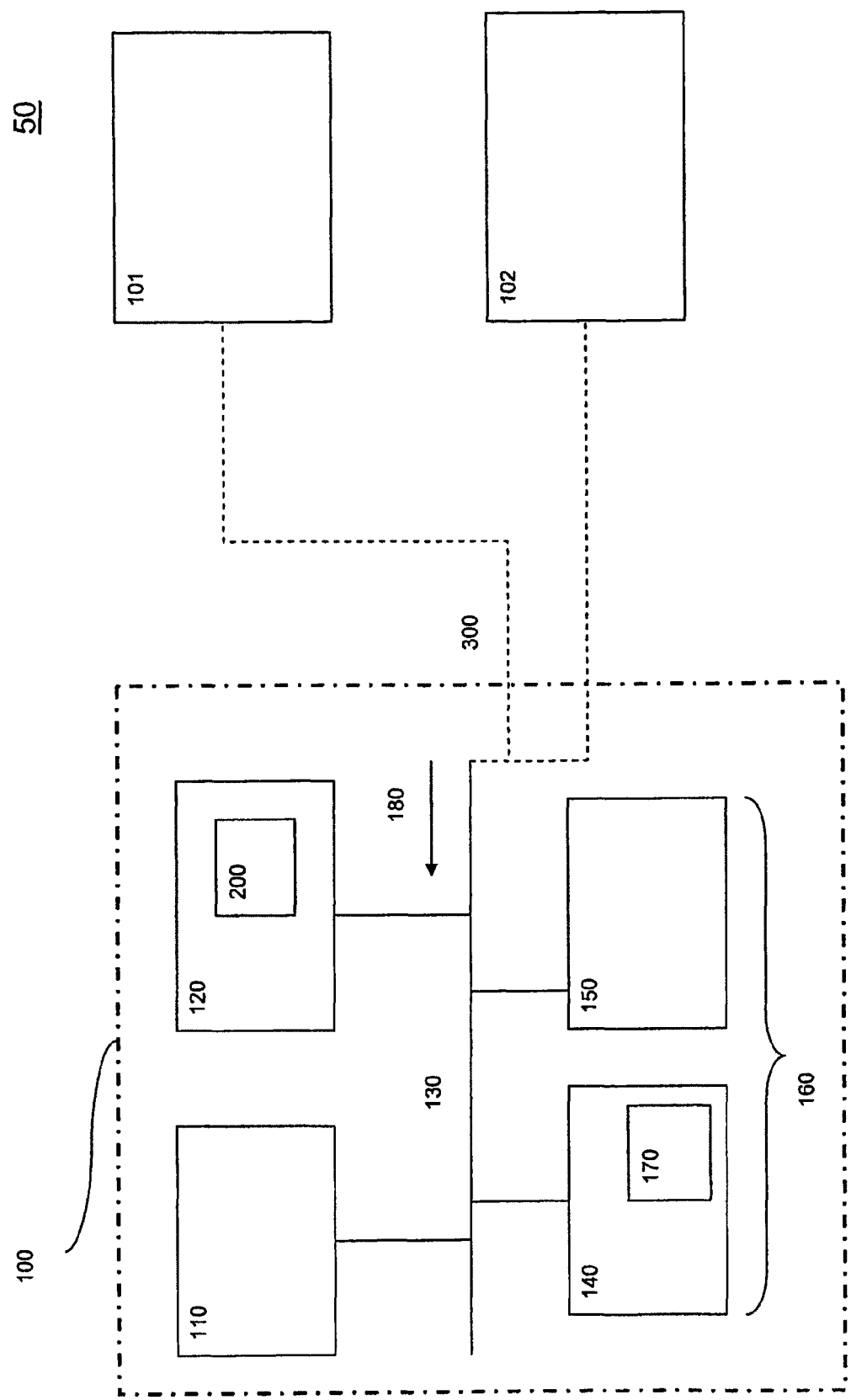

FIGS. 10a to d are views of distributions of the magnification (FIGS. 10a, c) and the distortion (FIGS. 10b, d) of a spectacle lens optimized according to the invention and having a spherical effect of −4.0 dept and a cylindrical effect of 0.0 dpt;

FIGS. 10 a, b are views of the distributions of the magnification and the distortion, in which case the magnification and the distortion were calculated while taking into account an infinite object distance;

FIGS. 10c, d are views of the distributions of the magnification and the distortion, in which case the magnification and the distortion were calculated while taking into account an object distance model according to which the infinite object distance in the upper section of the spectacle lens changes in a progressive manner into an object distance of −2.6 dpt at x=0 mm mm, y=−20 mm;

FIGS. 11a, b are views of distributions of the magnification (FIG. 11a) and of the distortion (FIG. 11b) of a conventional spectacle lens having a spherical effect of −4.0 dpt and a cylindrical effect of 0.0 dpt, in which case the magnification and the distortion were calculated at an infinite object distance;

FIGS. 12a-d are views of distributions of the magnification (FIGS. 12a, c) and the distortion (FIG. 12 b, d) of a spectacle lens optimized according to the invention having a spherical effect of −4.0 dpt and a cylindrical effect of 2.0 dpt, axis 0°;

FIGS. 12a, b are views of distributions of the magnification and the distortion, in which case the magnification and the distortion were calculated at an infinite object distance;

FIGS. 12c, d are views of distributions of the magnification and the distortion, in which case the magnification and the distortion were calculated while taking into account an object distance model, according to which the infinite object distance in the upper section of the spectacle lens changes progressively into an object distance of −2.6 dpt at x=0 mm, y=−20 mm;

FIGS. 13a, b are views of distributions of the magnification (FIG. 13a) and the distortion (FIG. 13b) of a conventional spectacle lens having a spherical effect of −4.0 dpt and a cylindrical effect of 2.0 dpt, axis 0°, in which case the magnification and distortion were calculated at an infinite object distance;

FIG. 14 is a schematic representation of an example of the preferred system for calculating the local magnification and/or the local distortion of a spectacle lens and/or for calculating or optimizing the at least one surface of the spectacle lens.

The magnification of a spectacle lens is defined as a quotient between the retinal image size with a spectacle lens and the retinal image size without a spectacle lens.

For calculating the magnification, a suitable system of coordinates is first introduced. In the case of a viewing angle magnification, the system of coordinates for a given viewing direction can be defined by the following steps:

a) A Cartesian system of coordinates is first defined with respect to an imaginary eye (for example, a model eye) in the primary position, so that the z-direction points in the light direction; the y-direction points upward in space, and the x-direction points toward the right from the view of the viewing person. The point (x,y,z)=(0,0,0) is situated in the rotation point of the eye Z'.

b) Polar coordinates are assigned to each point (x,y,z), according to the transformation:

$$x = r\cos\vartheta\sin\varphi \qquad r = \sqrt{x^2 + y^2 + z^2} \qquad (8)$$
$$y = r\sin\varphi \quad \text{or} \quad \varphi = \arctan\frac{x}{z}$$
$$z = -r\cos\vartheta\cos\varphi \qquad \vartheta = \arcsin\frac{y}{\sqrt{x^2 + y^2 + z^2}}$$

c) The eye is rotated to the given viewing direction. The system of polar coordinates is rotated along with it corresponding to a model for the reference direction of the torsion. The model of the torsion will be discussed in detail in connection with Formula 9.

d) The point of perforation of the main beam through the standard ball around the point of rotation Z' of the eye has the polar coordinates (r=1, φ=0, θ=0). All other neighboring beams of have angular coordinates (φ, θ) different from zero.

In the case of the visual angle magnification, the same system of coordinates can be used, with the difference that the rotation center (x,y,z)=(0,0,0) for the Cartesian system of coordinates, instead of being situated in the rotation point of the eye, is situated in the entrance pupil or in the point corresponding to the used model (for example, possibly also in the principal plane).

The magnification Γ of a spectacle lens can be calculated as follows. In the viewing-angle-based 2-dimensional system of coordinates, the change of an infinitesimally small object when looking through the spectacle lens is considered in comparison to the view without the spectacle lens.

Without spectacles, the infinitesimally small object, illustrated by an arrow, would have the low end coordinates (φ, θ)=(0,0); the tip of the arrow has the coordinates (dφ, dθ). The coordinates not having an apostrophe correspond to the look without spectacles or a spectacle lens. This situation is part of the viewing direction which the eye assumes without spectacles and of the torsion position which, according to the used reference direction model, is part of this viewing direction. In comparison, generally a different viewing direction and therefore also a different torsion position of the eye is part of the view through the spectacles at the same object because of the prismatic effect. In the system of coordinates having an apostrophe, the object now looks different. Although the low-end point also has the coordinates (φ', θ')=(0,0); the tip is now at (dφ', dθ'). Generally, such a change can be described by a linear image, which transforms (dφ, dθ) into (dφ', dθ').

$$\begin{pmatrix} d\varphi \\ d\vartheta \end{pmatrix} = N_g^{-1} \begin{pmatrix} d\varphi' \\ d\vartheta' \end{pmatrix} \qquad (9)$$

In Formula 9, $N_g$ indicates the magnification matrix of the spectacle lens.

Different models can be used for determining the reference direction of the torsion. The reference direction of the torsion is preferably determined according to Listing's Rule for the Distance. However, the reference direction of the torsion can also be based on Listing's Rule for the Proximity, or the intersection line of the horizontal plane and the plane perpendicular to the main beam can be determined as the reference direction. For this purpose, formulas are indicated together with the set of formulas 35 to 37. However, it is important here that the various models differ only with respect to a torsion motion on the input or output side, and the values Γ and Z for the magnification or the distortion are invariant during such a rotation.

The magnification matrix $N_g$ can be represented as a 2×2 matrix in the following form:

$$N_g = \begin{pmatrix} a & b \\ c & d \end{pmatrix} \qquad (10)$$

The Eigenvalues of a symmetrized form of the magnification matrix $N_g$ are the main magnifications whose average value results in the magnification Γ and whose difference results in the distortion Z. The following formulas therefore apply to the magnification (indicated as a factor or as a percent) of the spectacle lens:

$$\Gamma = \frac{1}{2}\sqrt{(b-c)^2 + (a+d)^2} \qquad \text{as a factor or} \qquad (11a)$$
$$\Gamma = \left(\frac{1}{2}\sqrt{(b-c)^2 + (a+d)^2} - 1\right) * 100\% \qquad \text{in percent.} \qquad (11b)$$

Correspondingly, the distortion can be calculated according to the formulas:

$$Z = \sqrt{(b+c)^2 + (a-d)^2} \qquad (12a) \text{ as a factor or}$$
$$Z = (\sqrt{(b+c)^2 + (a-d)^2} - 1) * 100\% \qquad (12b) \text{ in percent.}$$

Figure 1:
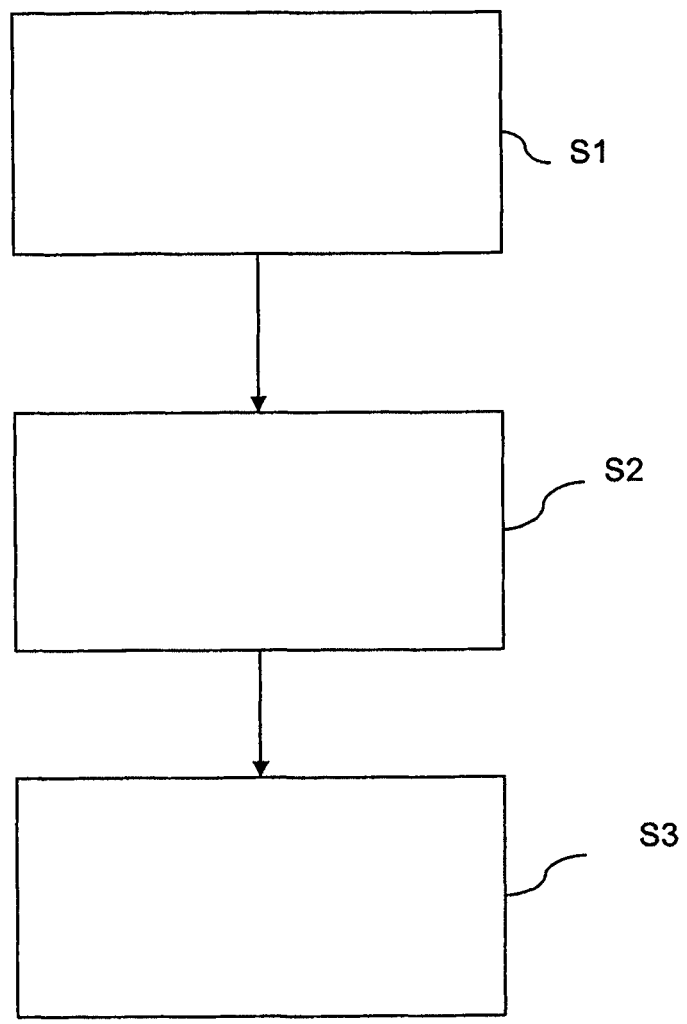
FIG. 1 is a flow chart of the method according to the invention.

FIG. 1 is a flow chart illustrating the method according to the invention of calculating the local magnification of a spectacle lens during the refraction by the spectacle lens.

In a first step S1, the course of a main beam originating from a reference object point is determined by means of ray tracing. As a result, the parameters of the main beam, such as the angle of incidence and reflection respectively, the intersection points with the boundary surface, etc., can be determined.

In the case of the visual angle magnification, the main beam is defined as that ray which, after the refraction by the spectacle lens, extends through the entrance pupil of the eye and is incident on the retina. In the case of the viewing angle magnification, the main beam is defined as that ray which, after the refraction by the spectacle lens, extends through the rotation point Z' of the eye and is incident on the retina. It is also conceivable to take into account a main beam which extends through the principal plane of the eye.

Figure 2:
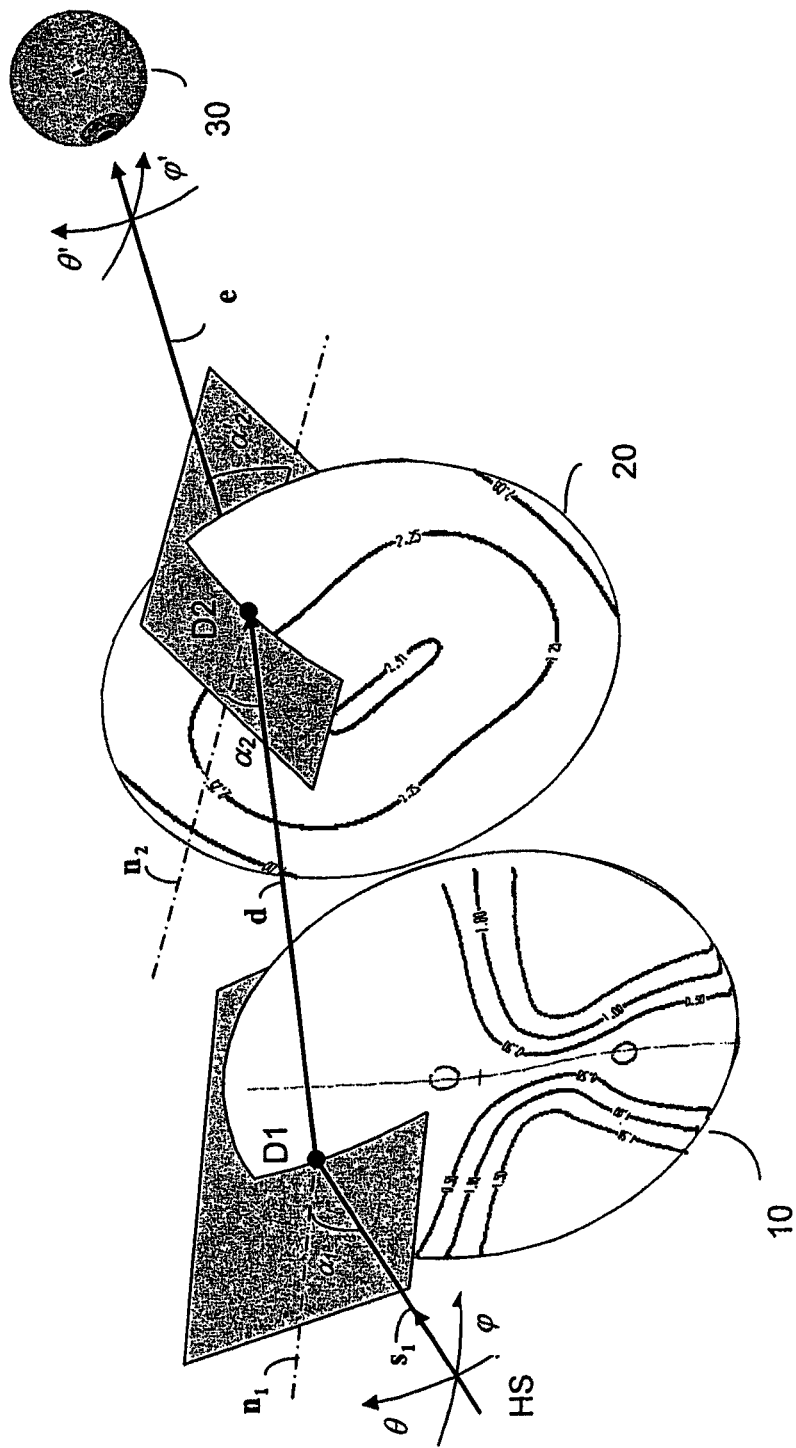
FIG. 2 is a schematic representation of the course of the main beam during refraction on a spectacle lens.

FIG. 2 is a schematic representation of the course of the main beam HS through a spectacle lens. The spectacle lens comprises a first, object-side front face 10 and a second, eye-side or image-side back face 20. The two surfaces may be any surfaces (for example, spherical, aspherical, toric, atoric or progressive surfaces). In the example illustrated in FIG. 2, the front face 10 is a progressive surface and the back face 20 is an atoric surface.

The main beam HS can be represented as the sum of the following components and vectors respectively:

Vector $s_1$ in the light direction of the object-side main beam HS between the object point O viewed in a predetermined viewing direction and the intersection point D1 of the main beam HS with the front face 10;

vector d in the light direction of the main beam HS between the intersection point D1 of the main beam HS with the front face 10 and the intersection point D2 of the main beam HS with the back face 20;

vector e in the light direction of the image-side main beam HS between the intersection point D2 of the main beam HS with the back face 20, and preferably the entrance pupil of the eye 30 in the case of the visual angle magnification or the preferable rotation point of the eye 30 in the case of the viewing angle magnification.

The vector e relates to the point through which all main beams extend. This point may vary depending on the selected magnification model. In the case of the viewing angle magnification, the angular ratio in the definition of the magnification refers the angle of the view deflection which the eye has to carry out during the change of the view from a low end of the object to the tip of the object. In contrast, in the case of the magnification of the visual angle, that angle is relevant at which the retinal image is seen from the entrance pupil when the eye is held still. Both types of magnification can be calculated according to one and the same formula. It is decisive that, in each case, the vector e refers to a point through which all main beams extend. In the case of the viewing angle magnification, this is rotation point Z' of the eye; in the case of the visual angle magnification, it is the center of the entrance pupil.

By means of a ray tracing, the corresponding parameters of the vectors $s_1$ (direction, length $s_1$), d (direction, length d) and e (direction, length e) can be determined. The length $s_1$ of the vector $s_1$ is also called the focal length.

By means of ray tracing of the course of the main beam, the following can be determined:

The intersection points D1 and D2 of the main beam HS with the front face and the back face, the angles of incidence and reflection $\alpha_1$ and $\alpha_1'$, which the main beam forms with a normal vector $n_1$ with respect to the front face 10 in the intersection point D1, the angles of incidence and reflection $\alpha_2$ and $\alpha_2'$, which the main beam forms with a normal vector $n_2$ with respect to the back face 20 in the intersection point D2.

The preceding signs of the normal vectors are defined such that the normal vector point in the light direction.

As soon as the course of the main beam has been determined, in a second step S2, the change of the local wave front pertaining to the main beam during the refraction by the spectacle lens is calculated. The characteristics of the wave front pertaining to the main beam during the refraction by the spectacle lens can be calculated directly by means of wave tracing from the following data:

The already determined characteristics of the central main beam (the angles of incidence and reflection at the spectacle lenses, the intersection points with the respective surface of the spectacle lens);

the predetermined characteristics of the spectacle lens (refractive index, thickness, main curvatures and directions of the respective surface of the spectacle lens in the intersection points of the main beam with the respective surface of the spectacle lens); and the main curvatures and direction of the incoming wave front which depend on the assumed model of the object distance in the predetermined or predeterminable viewing direction.

In a third step S3, without any new ray calculation of a ray adjacent to the main beam, the magnification of the spectacle lens is calculated from the determined characteristics (main curvatures and main directions) of the local wave front pertaining to the main beam.

In this case, particularly—deviating from the state of the art—, a finite focal length or a finite object distance $s_1$ is taken into account. In other words, it is taken into account that at least one main curvature of the incoming local wave front is not equal to zero.

In a preferred embodiment, the incoming wave front is spherical with identical main curvatures differing from zero.

Figure 3:
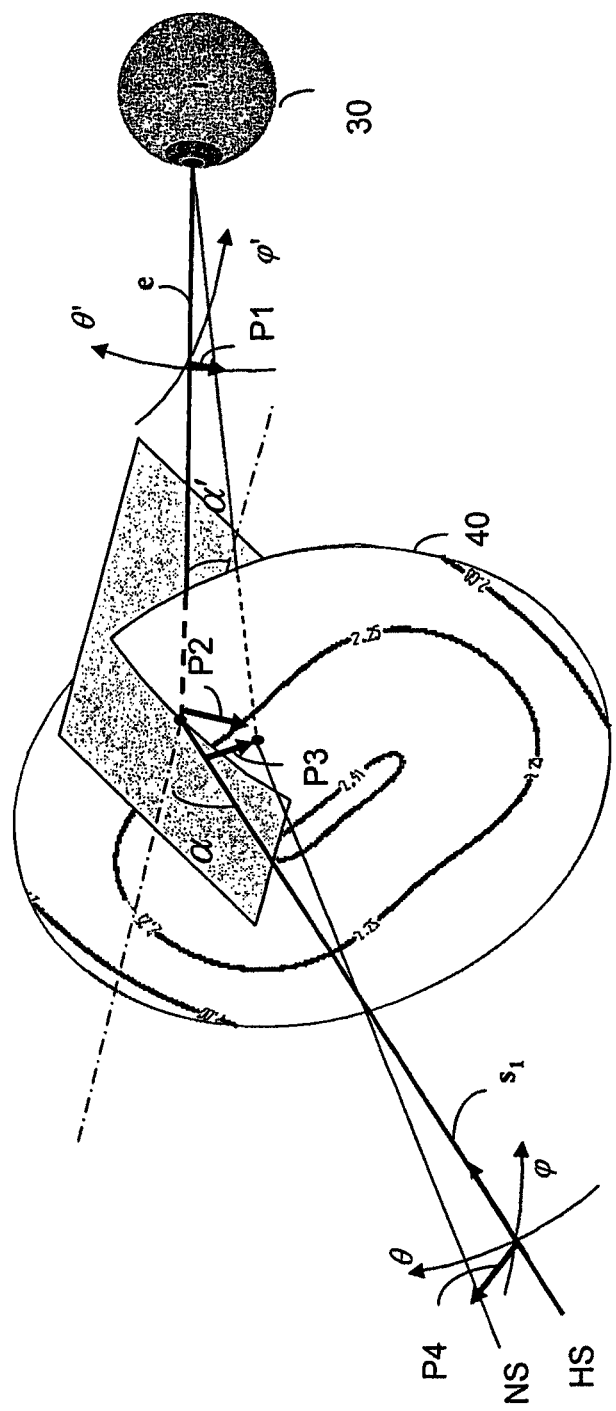
FIG. 3 is a schematic representation of the change of the characteristics of the local wave front during refraction on a boundary surface.
Figure 4:
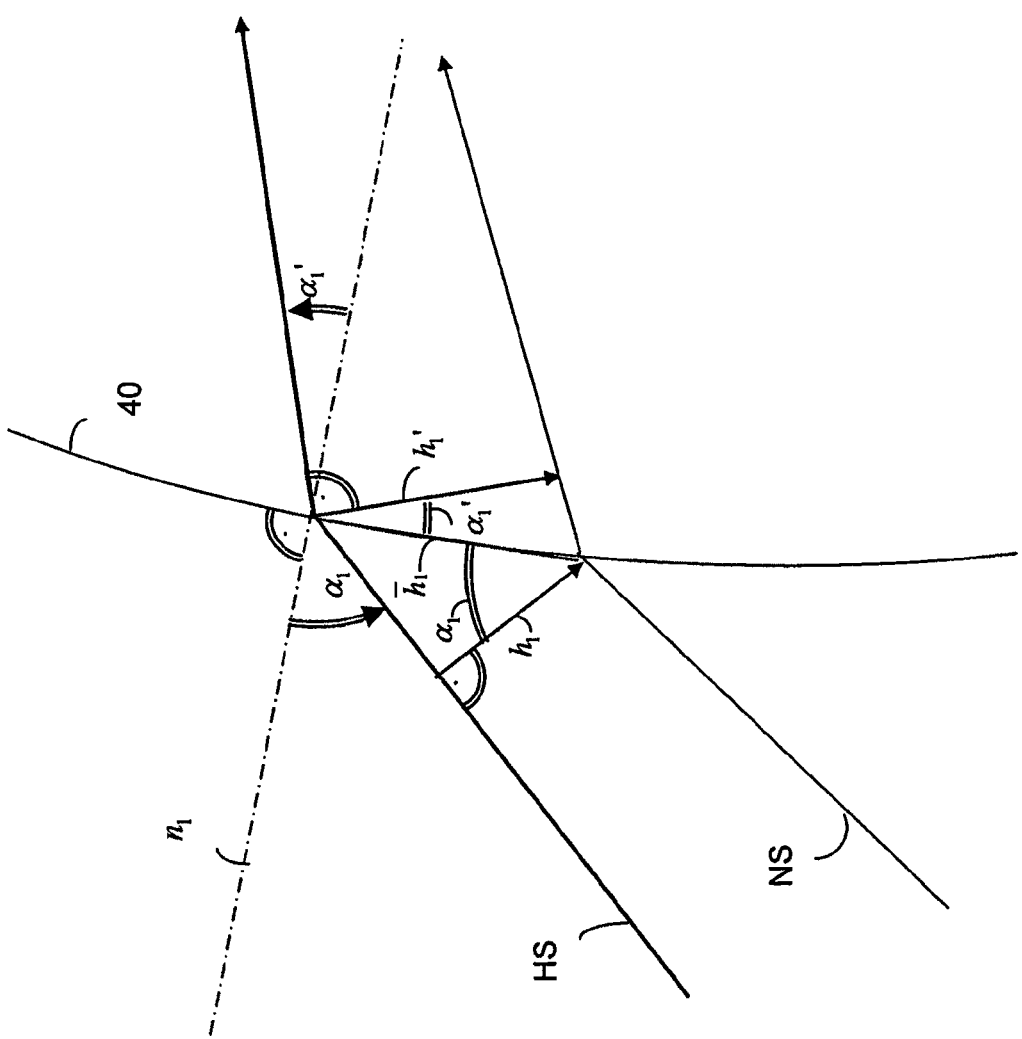
FIG. 4 is a schematic representation of the change of the distance of a neighboring beam from the main beam during a passage through a refracting surface, viewed in the refraction plane.

The determination of the characteristics of the local wave front by means of wave tracing is illustrated by FIGS. 3 and 4. FIG. 3 is a schematic representation of the course of the main beam and of the change of the local wave front at a boundary surface or refracting surface 40 (for example, front face or back face of the spectacle lens). FIG. 4 is a schematic representation of the change of the distance of a neighboring ray NS from the main beam HS when passing through a refracting surface 40, viewed in the refraction plane. In FIG. 4, $\alpha_1$ indicates the angle of incidence, $\alpha_1'$ indicates the angle of reflection of the main beam HS, $n_1$ indicates the normal vector to the refracting surface 40 in the intersection point of the main beam with the refracting surface 40.

A significant step of the magnification calculation consists of considering the (infinitesimal) distance of an imaginary neighboring ray from the main beam HS and of tracing how the latter changes during the refraction at the boundary surface. This distance is illustrated in FIG. 3 by the numbered arrows P1 to P4. Arrow P1 determines at which angle the main beam and the neighboring ray are seen from the eye and thus is entered directly into the definition of the magnification. Arrow P2 symbolizes this distance on the back side of a refracting surface; arrow P3 directly before the refraction on the boundary surface 40. Arrow P4 describes the spacing at a predetermined distance or at a predetermined location in front of the refracting surface 40. In the actual calculation, this location may be situated, for example, on the back side of another refracting surface or on the object itself. Arrow P4 generally has a different length and, as required, a different orientation than arrow P3 because of the fact that the main beam and the neighboring ray generally extend in a skew manner in front of the refracting surface.

The change of the infinitesimally small object during the refraction on a refracting surface is illustrated in greater detail in FIG. 4.

As illustrated in FIG. 4, $$h_1 = \bar{h}\cos\alpha_1 \quad \Rightarrow h_1 = h_1'\frac{\cos\alpha_1}{\cos\alpha_1'}, \quad (13)$$
$$h_1' = \bar{h}\cos\alpha_1'$$

wherein $h_1$ indicates the distance between the main beam and the neighboring ray before the refraction;

$h_1'$ indicates the distance between the main beam and the neighboring ray after the refraction; and h indicates the distance of the intersection points of the respective main beam HS (Point D1) and of the neighboring ray NS (Point D1') with the refracting surface 40.

In a first approximation, the magnification of the spectacle lens can be calculated on the basis of a simplified model of the spectacle lens—eye system. In this model, coaxial rays are taken into account. However, according to the invention, no demands are made on the object distance.

Figure 5:
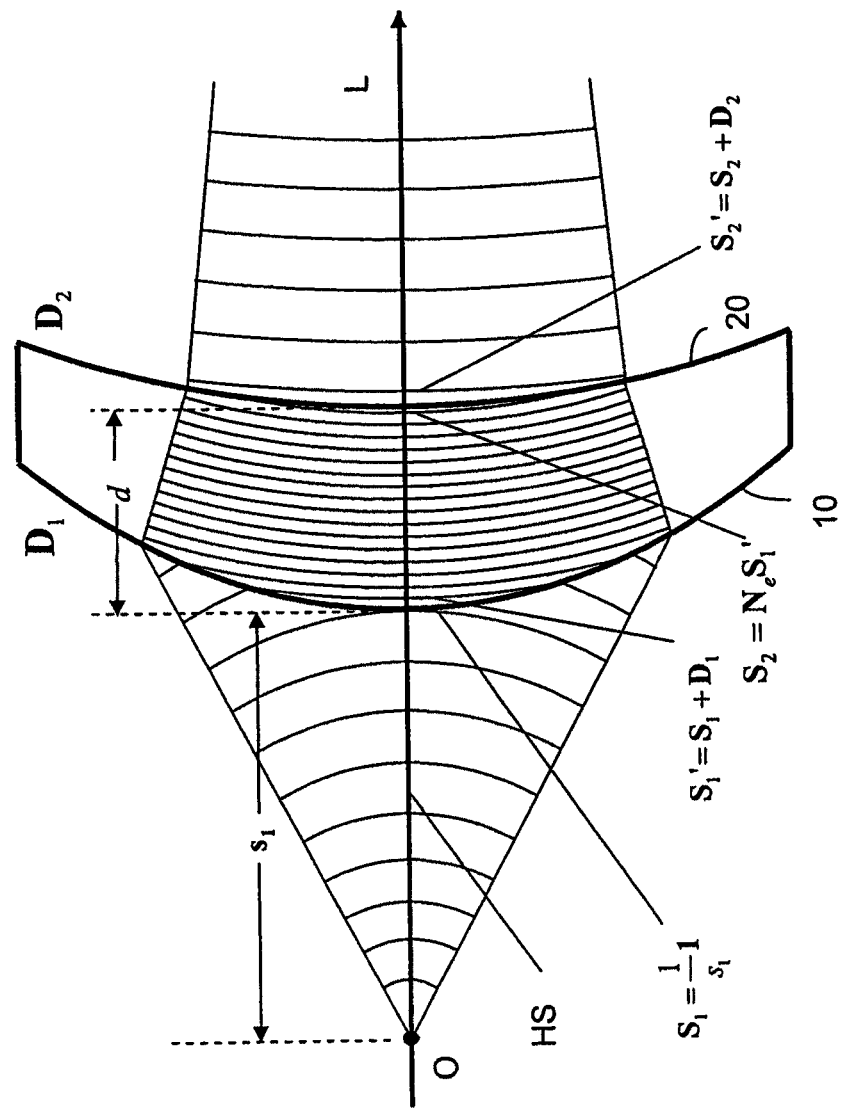
FIG. 5 is a schematic representation of the course of the main beam and the change of the wave front in a paraxial approximation.

FIG. 5 illustrates the course of the main beam and the change of the local wave front in a paraxial approximation in the case that the main beam is incident in a perpendicular manner on the surfaces.

In FIG. 5, HS indicates the main beam which, because of its course perpendicular with respect to the surfaces, progresses unrefracted from the object through the lens in the light direction L. $S_1$ indicates the curvature matrix of the wave front incident from the object at the location of the front face 10 of the spectacle lens; $S_1'$, in contrast, indicates the curvature matrix of the wave front extending from the front face 10 and ending in the lens interior. Furthermore, in FIG. 5, $s_1$ indicates the focal length, and d indicates the center thickness of the spectacle lens.

$D_1$ relates to the surface power matrix of the front face 10, and $D_2$ relates to the surface power matrix of the back face 20 of the spectacle lens.

While the wave front $S_1$ is still spherical and therefore proportional to the standard matrix, $S_1'$ will generally only be spherical if the front face 10 or $D_1$ is spherical; otherwise, $S_1'$ will be cylindrical. During its course through the spectacle lens, the curvature of the wave fronts increases the more, the longer the distance d to be covered. Wave fronts with the curvature matrix $S_2$ therefore arrive on the back face 20. During the refraction on the back face 20, wave fronts then finally run out with the curvature matrix $S_2'$.

In a preferred embodiment, the spectacle lens has a first and a second rotationally symmetrical surface (for example, sphere). The surface power of the i-th surface (i=1, 2) can be determined according to the following formula:

$$D_i = \frac{(n-1)}{2}\left(\frac{1}{r_{i,2}^a} + \frac{1}{r_{i,2}^b}\right), i = 1, 2 \qquad (14)$$

wherein
n indicates the refractive index of the spectacle lens; and $r_i^{a,b}$, i=1, 2 indicates the main curvatures of the i-th surface.

As explained in detail above, by means of ray tracing, the course of the main beam and particularly the component (direction and length) of the above-mentioned vectors $s_1$, d and e can be determined.

The magnification matrix $N_g$ can be analytically calculated on the basis of the data of the spectacle lens, the data of the incoming wave front as well as the determined data of the main beam. In a paraxial approximation, in the present rotationally symmetrical case, the magnification matrix $N_g$ is proportional to the standard matrix 1 and can therefore be written as a scalar quantity:

$$N_g = N_g 1 \qquad (15)$$

wherein $N_g$ represents the wanted scalar magnification of the spectacle lens.

Taking into account a finite focal length $s_1$, the magnification $N_g$ can be calculated according to the following formula:

$$N_g^{-1} = \sigma \cdot N_e^{-1} N_s^{-1} \qquad (16)$$

$$N_e^{-1} = 1 - \frac{d}{n} S_1' \qquad (17)$$

$$N_s^{-1} = 1 - eS_2' \qquad (18)$$

Symbol σ indicates a scaling factor for taking into account a finite focal length $s_1$, which is calculated according to the formula:

$$\sigma = \frac{|s_1|}{|s_1 + d + e|} \qquad (19)$$

The vectors $s_1$, d, e are determined, as described above, by ray tracing of the main beam.

The change of the local wave front is described by the following formulas:

$$S_2' = S_2 + D_2 \qquad (20)$$

$$S_2 = N_e S_1' \qquad (21)$$

$$S_1' = S_1 + D_1 \qquad (22)$$

$$S_1 = \frac{1}{s_1} \qquad (23)$$

wherein:

$$S_1 = \frac{1}{s_1}$$

indicates the curvature of the local wave front incident at the intersection point of the main beam with the front face;
$S_2$ indicates the curvature of the local wave front incident at the intersection point of the main beam with the back face.

In the paraxial case, Formulas 16 to 23 are particularly suitable for a simple and precise calculation of the magnification of a spectacle lens with spherical front and back faces while taking into account a realistic object model or model of the viewed object space.

According to another preferred embodiment of the invention, when calculating the magnification of a spectacle lens, in addition to a finite focal length, a form of the spectacle lens surfaces that is not rotationally symmetrical is also taken into account. The obtained expression for the magnification of a spectacle lens supplies exact results for spectacle lenses with rotationally asymmetrical surfaces, such as toric or locally toric surfaces for an arbitrary finite object distance in a coaxial approximation.

Figure 6:
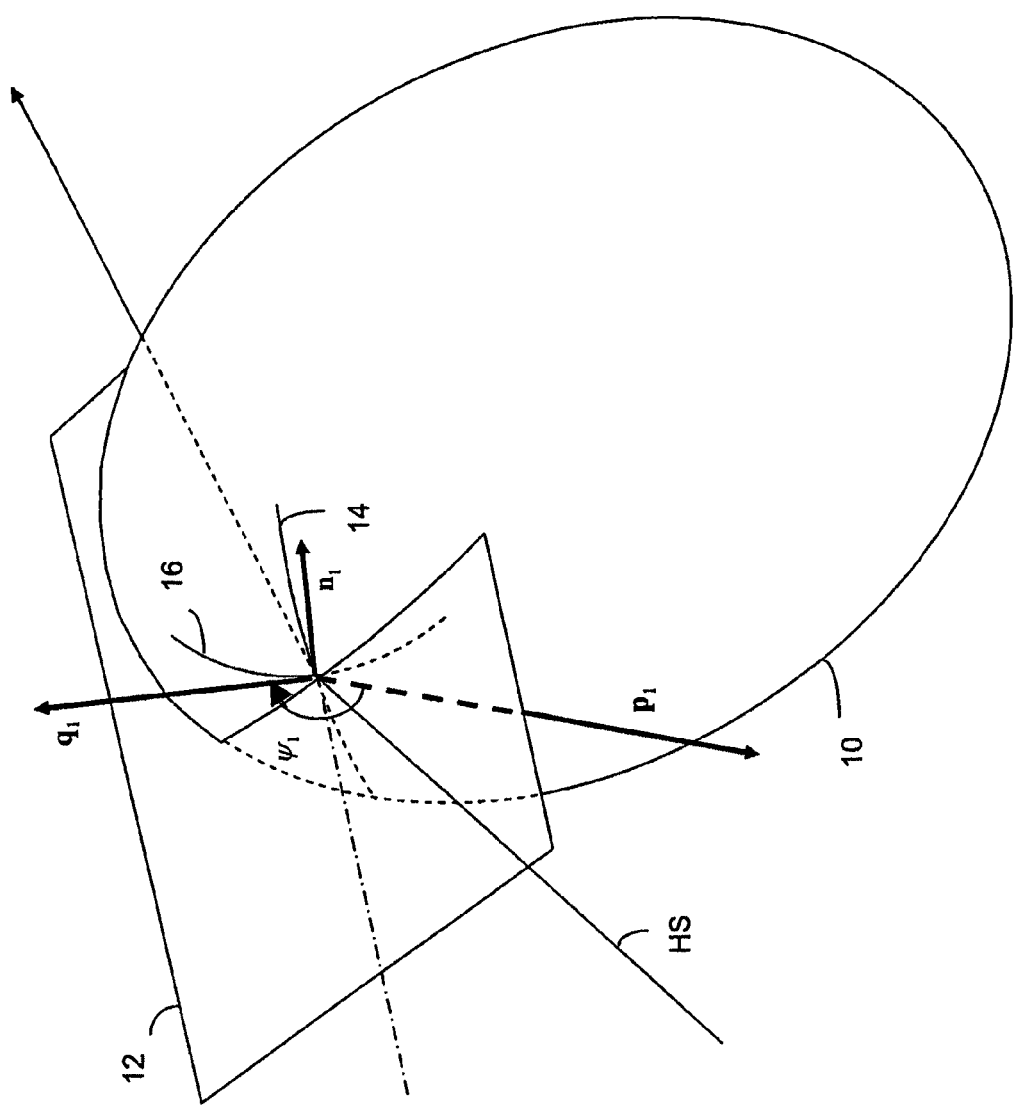
FIG. 6 is a schematic representation of all angles and vectors at the refractive surface which are relevant to the description of the refraction and the main curvature directions of the refractive surface.
Figure 6:
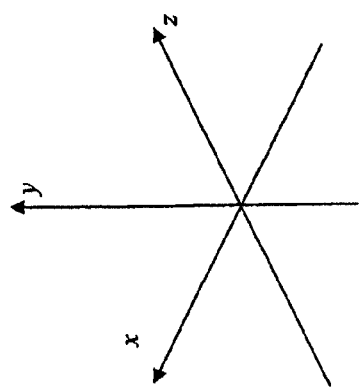

FIG. 6 is a schematic representation of all angles and vectors on the refracting surface which are relevant to the description of the refraction and the main curvature directions of the refracting surface. As an example, the refracting surface in FIG. 6 is the first (i=1) or the front face 10 of the spectacle lens. In FIG. 6, the reference number 12 indicates the refraction plane on the front face of the spectacle lens; reference number 14 indicates the less curved main section; and reference number 16 indicates the more curved main section, which extends in the direction $q_1$, all quantities relating to local quantities in the intersection point of the main beam HS with the front face. Vector $p_1$ indicates the normal vector to the refraction plane 12 at the front face 10; vector $n_1$ indicates the normal vector of the front face 10 in the intersection point of the main beam HS with the front face 10.

The local surface power in a predetermined point of the i-th (i=1, 2) rotationally symmetrical surface of the spectacle lens can be determined by a surface power matrix $D_1$:

$$D_i = \begin{pmatrix} Sph_i \frac{Zyl_i}{2}\cos 2\psi i & -\frac{Zyl_i}{2}\sin 2\psi i \\ -\frac{Zyl_i}{2}\sin 2\psi i & Sph_i + \frac{Zyl_i}{2}\cos 2\psi i \end{pmatrix}, i = 1, 2, \quad (24)$$

In Formula 24, $Sph_i$, i=1, 2 indicates the spherical equivalent, and $Zyl_i$, i=1, 2 indicates the cylinder of the i-th surface of the spectacle lens, which are calculated as follows:

$$Sph_i = \frac{(n-1)}{2}\left(\frac{1}{r_i^a} + \frac{1}{r_i^b}\right) \quad (25)$$

$$Zyl_i = \frac{(n-1)}{2}\left(\frac{1}{r_i^a} - \frac{1}{r_i^b}\right), i = 1, 2 \quad (26)$$

wherein:
$r_i^{a,b}$, i=1, 2 are the main curvature radii of the i-th surface of the spectacle lens; and
$\Psi_i$ indicates the angle between the normal vector $p_i$ of the refraction plane at the i-th surface and the direction $q_i$, into which the more curved main section 16 extends. In this case, the preceding sign in this direction is determined by the fact that the x-component of $q_i$ is positive.

The rotating direction of the angle $\Psi_i$ illustrated in FIG. 6, which is an example of the front face 10 (therefore i=1 here), extends in a mathematically positive direction with respect to the x-y plane of the shown system of coordinates. If the normal vector of the i-th surface is indicated by $n_i$, the angle $\Psi_i$ can be clearly defined by:

$$\sin \psi_i = (p_i \times q_i) \cdot n_i$$

$$\cos \psi_i = p_i \cdot q_i \quad (27)$$

In the case of arbitrary surfaces (which, however, are situated in the space such that they are perpendicularly perforated by the main beam), in paraxial approximation, the magnification matrix $N_g$ can be calculated according to the following formulas, where all quantities $N_g^{-1}$, $N_e^{-1}$, $N_s^{-1}$, $S_{1,2}$, $S'_{1,2}$, $D_{1,2}$ are each represented in matrix form:

$$N_g^{-1} = \sigma \cdot N_e^{-1} N_s^{-1} \quad (28)$$

$$N_e^{-1} = 1 - \frac{d}{n}S'_1 \quad (29)$$

$$N_s^{-1} = 1 - eS'_2 \quad (30)$$

wherein
$N_e^{-1}$ indicates the inverse matrix of the shape magnification;
$N_s^{-1}$ indicates the inverse matrix of the system magnification; and
the scaling factor $\sigma$ is calculated according to Formula 19.

The change of the local wave front can be described as follows:

$$S'_2 = S_2 + D_2 \quad (31)$$

$$S_2 = N_e S'_1 \quad (32)$$

$$S'_1 = S_1 + D_1 \quad (33)$$

$$S_1 = \frac{1}{s_1} 1 \quad (34)$$

wherein:
$S_1$ indicates the local curvature or vergency matrix of the incident spherical wave front on the first object-side surface of the spectacle lens;
$S'_i$, i=1, 2 indicates the local curvature or vergency matrix of the wave front after the refraction on the i-th surface of the spectacle lens according to the law of refraction; and
$S_2$ indicates the curvature matrix of the wave front incident on the second, eye-side surface of the spectacle lens, which is to be calculated after the transfer from the front face.

In the above Formulas 28 to 34, all local quantities ($S'_i$, $D_i$, $S_2$, etc.) relate to the corresponding local quantities at the intersection points of the main beam with the respective surface of the spectacle lens. Formulas 28 to 34 may be considered to be a direct matrix expansion of Formulas 16 to 23. In the paraxial case, Formulas 28 to 34 permit a simple and fast calculation of the magnification of an arbitrary spectacle lens; that is, of a spectacle lens with rotationally asymmetrical surfaces, particularly aspherical, atoric and progressive surfaces, while taking into account a realistic object model.

The magnification $N_g$ and the distortion Z are calculated according to Formulas 11a, 11b and 12, 12b respectively from the parameters of the magnification matrix $N_g$.

Formulas 16 to 23 as well as Formulas 28 to 34 apply to a paraxial approximation; that is, a perpendicular incidence of the local wave front on the front face of the spectacle lens. However, these formulas may be further expanded, so that, in addition to a finite focal length $s_1$ and arbitrary aspherical surfaces of the spectacle lens, an arbitrary course of the main beam (that is, arbitrary angles of incidence and deflection), as illustrated in FIG. 2, is also taken into account.

In this general case, it is most practical to represent the magnification matrix $N_g$ as an inverse matrix:

$$N_g^{-1} = \sigma \cdot R_1^{-1} T_1^{-1} N_e^{-1} R_{12} T_2^{-1} N_s^{-1} R_2 \quad (35)$$

The scaling factor $\sigma$ is determined according to Formula 19 while taking into account the parameters of the main beam and the vectors $s_1$, d, e respectively determined by ray tracing.

The inverse matrix of the shape magnification $N_e^{-1}$, and the inverse matrix of the system magnification $N_s^{-1}$ are calculated according to the formulas:

$$N_e^{-1} = 1 - \frac{d}{n}S'_1 \quad (36)$$

$$N_s^{-1} = 1 - eS'_2 \quad (37)$$

The expressions for the curvature matrices $S_1'$ of the wave front after the refraction on the i-th surface of the spectacle lens or for the curvature matrix $S_2$ of the wave front incident on the second, object-side surface of the spectacle lens, which are entered into the calculation of $N_e^{-1}$ and $N_s^{-1}$, are corrected so that also an arbitrarily inclined incidence of the main beam or an incidence of the arriving wave front that is not paraxial is taken into account (compare Table 1).

Likewise, the expressions for the local surface power matrix of the i-th surface at the intersection point of the i-th surface with the main beam are corrected so that also an incidence of the wave front that is not paraxial is taken into account (compare Table 1).

Table 1 indicates the significance of the individual factors in Formulas 35 to 37, wherein the index i=1, 2 indicates the reference to the front face (i=1) or back face (i=2) of the spectacle lens. The individual factors or quantities are always evaluated at the intersection points of the main beam with the respective surface of the spectacle lens. The factors or quantities not having an apostrophe are evaluated on the object side of the respective surface and the factors or quantities having an apostrophe are evaluated on the image side of the respective surface.

Even though the results for the magnification and the distortion (Formulas (11) and (12)) are independent of the selection of the model, which determines the reference direction of the rotation about the eye-side or image-side main beam, the preferably used model of Listing's Rule for the Distance is indicated here. When, according to Listing's Rule for the Distance, the eye rotates from the primary position into a certain viewing direction, which is characterized by the main beam components (x,y,z), after the rotation, the new x-direction generally forms a finite angle with the standard vector $p_i=(p_{i,x}, p_{i,y}, p_{i,z})$ i=1, 2 perpendicular to the refraction plane at the i-th surface. In this case, the preceding sign of $p_i$ is determined by the cross product $p_i=HS_i \times n_i$, i=1, 2, wherein $n_i$ is the normal vector of the i-th surface oriented in the light direction, and $HS_i$ is the part of the main beam extending toward the respective surface; that is, $HS_1=s_1$ and $HS_2=d$. The matrices $R_i$, i=1, 2 occurring during calculation of the magnification matrix have the task of transforming from the eye system, which is given by the new x-direction, to the system for the refraction tracing which is defined by the vector $p_i$. The matrix definition provided in Table 1 relates to the pertaining rotating angle which is provided by:

$$\sin\phi_i = \frac{p_{i,y}x^2 - (p_{i,z} + p_{i,x}x)y}{x^2 + y^2} \text{ and} \quad (38)$$

$$\cos\phi_i = \frac{-p_{i,z}x + y(-p_{i,y}x + p_{i,x}y)}{x^2 + y^2}$$

In other words, an analogous assignment of the contributions in Formula 35 consists of the fact that the rotation matrices $R_1$, $R_2$ describe the transformation of coordinates between the reference direction defined by means of Formula 8 about the main beam and the system of the refraction plane. $R_{12}$ describes the transformation between the systems of the refraction planes of the two surfaces 10 and 20 of the spectacle lens. $N_e^{-1}$ describes the change of the curvature of the wave fronts during the transfer from the front to the back face as well as the turning of the distance arrow between the two surfaces because of the skew orientation between the main beam and the neighboring ray. Finally $T_1^{-1}$ and $T_2^{-1}$ describe the change of this distance during the refraction on the respective surface. These matrices are diagonal and, in the component perpendicular to the refraction plane, have a 1 because the distance between the main beam and the neighboring ray in the component perpendicular to the refraction plane does not change. In contrast, the ratio of the cosines of the angles of incidence and deflection occurs within the refraction plane, as illustrated in FIG. 4.

TABLE 1

Set of Formulas for the Evaluation of the Result in Formulas 35 to 37

| | | |
|---|---|---|
| $R_1 = R(\phi_1)$ | | 2 × 2 rotation matrix within the plane perpendicular to the object-side main beam $s_1$ from the system of the front face, defined by the normal vector $p_1$ perpendicular to the plane of refraction at the front face, onto a suitable reference direction $p_0$ which is part of the selected model; |
| $\phi_1$ | | angle between the normal vector $p_1$ and the reference direction vector $p_0$; |
| $R_2 = R(\phi_2)$ | | 2 × 2 rotation matrix within the plane perpendicular to the object-side main beam e from the system of the back face, defined by the normal vector $p_2$ perpendicular to the plane of refraction of the back face, onto the corresponding reference direction $p_0$, which is part of the same model as the rotation matrix $R_1$; |
| $\phi_2$ | | angle between the normal vector $p_2$ and the reference direction vector $p_0$; |
| $R_{12} = R(\phi_{12})$ | | 2 × 2 rotation matrix within the plane perpendicular to the main beam d between the surfaces, which transforms the normal vector $p_1$ perpendicular to the plane of refraction on the front face into the corresponding normal vector $p_2$ on the back face (that is, vector perpendicular to the plane of refraction on the back face); |
| $\phi_{12}$ | | angle between the normal vectors $p_1$ and $p_2$; |
| $R(\varphi) = \begin{pmatrix} \cos\phi & -\sin\phi \\ \sin\phi & \cos\phi \end{pmatrix}$ | (39) | general formula of the 2 × 2 rotation matrix; |
| $T_i = C_i C_i'^{-1}$, i = 1, 2 | (40) | 2 × 2 slope matrices for taking into account the influence of a oblique incidence of the main beam at the i-th surface on the magnification; |
| $C_i = \begin{pmatrix} \cos\alpha_i & 0 \\ 0 & 1 \end{pmatrix}$, i = 1, 2 | | |
| $C_i' = \begin{pmatrix} \cos\alpha_i' & 0 \\ 0 & 1 \end{pmatrix}$, i = 1, 2 | | |
| $\alpha_i$ | | incidence angle at the i-th surface, that is, angle between the vector along main beam incident on the i-th surface and the normal vector $n_i$, i = 1, 2 perpendicular to the i-th surface; |
| $\alpha_i'$ | | reflection angle at the i-th surface, that is, angle between the vector along the main beam emerging from the i-th surface and the normal vector $n_i$, i = 1, 2 perpendicular to the i-th surface; |
| $S_1 = \frac{1}{s_1} 1$ | (41) | local curvature or vergency matrix of the spherical wave front incident on the front face; |
| $S_i' = T_i S_i T_i + \tilde{D}_i$ | (42) | local curvature or vergency matrices of the wave fronts after the refraction at the i-th surface, calculated according to the law of refraction while taking into |

TABLE 1-continued

Set of Formulas for the Evaluation of the Result in Formulas 35 to 37

| | | |
|---|---|---|
| $S_2 = R_{12}^{-1} N_e S'_1 R_{12}$ | (43) | account the oblique angle of incidence of the main beam; local curvature or vergency matrix of the wave front incident on the back face, which is calculated after the transfer from the front face; |
| $\tilde{D}_i = v_i C'^{-1}_i D_i C'^{-1}_i$ | (44) | corrected local surface power matrix of the i-th surface at the intersection point of the i-th surface with the main beam, which takes into account a non-paraxial incidence of the wave front; |
| $D_i$ | | local surface power matrix of the i-th surface calculated according to Formulas 24 to 26; |
| $v_1 = \dfrac{n\cos\alpha'_1 - \cos\alpha_1}{n-1}$ | (45) | correction factor for taking into account the oblique angle of incidence of the main beam at the front face; |
| $v_2 = \dfrac{\cos\alpha'_2 - n\cos\alpha_2}{1-n}$ | (46) | correction factor for taking into account the oblique angle of incidence of the main beam at the back face. |

In simple special cases, the general expression for the magnification matrix $N_g$ according to Formula 35 changes to the classical formula (compare Formulas 1 to 7) for the magnification $N_g$.

In particular, the following applies:

a) In the paraxial case and assuming cylindrical surfaces, all angles of incidence and reflection become zero. All $C_j$ matrices, $T_j$ matrices and $R_j$ therefore become equal to the standard matrix 1, and all $v_j$ correction factors become equal to one;

b) For the infinite object distance, the curvature $S_1$ of the incident wave front becomes zero, and $S'_2$ becomes $S'_\infty$. Correspondingly, the following applies to the expressions $$N_e^{-1} = 1 - \frac{d}{n}D_1 \text{ and } N_s^{-1} = 1 - eS'_\infty.$$

The scaling factor σ becomes equal to one.

c) When, as a further simplification, the surfaces are even pure spheres instead of cylindrical surfaces, $N_e^{-1}$ and $N_s^{-1}$ and therefore also $N_g^{-1}$ are multiples of the standard matrix and can be represented in a scalar manner, specifically precisely in the form of classical Formula 1 for the magnification of a spectacle lens.

Formula 35 can be expanded for an arbitrary number of surfaces. In the case of, for example, 4 surfaces, the magnification matrix can be calculated according to the following formulas:

$N_1^{-1} = 1 - e_1 S'_1$ $S'_1 = \tilde{D}_1 + T_1 S_1 T_1$ (47)

$N_2^{-1} = 1 - e_2 S'_2$ $S'_2 = \tilde{D}_2 + T_2 S_2 T_2$ $S_2 = R_{12}^{-1} N_1 S'_1 R_{12}$ $R_{12} = R_{12}(\phi_{12})$ (48)

$N_3^{-1} = 1 - e_3 S'_3$ $S'_3 = \tilde{D}_3 + T_3 S_3 T_3$ $S_3 = R_{23}^{-1} N_2 S'_2 R_{23}$ $R_{23} = R_{23}(\phi_{23})$ (49)

$N_4^{-1} = 1 - e_4 S'_4$ $S'_4 = \tilde{D}_4 + T_4 S_4 T_4$ $S_4 = R_{34}^{-1} N_3 S'_3 R_{34}$ $R_{34} = R_{34}(\phi_{34})$ (50)

wherein the significance of the individual factors is indicated in Table 1 relative to the respective surfaces. In Table 1, Formulas 47 describe the magnification matrix $N_1^{-1}$ and the local wave front $S_1'$ after the refraction on the first surface;

Formulas 48 describe the magnification matrix $N_2^{-1}$ and the local wave front $S_2'$ after the refraction on the second surface;

Formulas 49 describe the magnification matrix $N_3^{-1}$ and the local wave front $S_3'$ after the refraction on the third surface;

Formula 50 describes the magnification matrix $N_4^{-1}$ and the local wave front $S_4'$ after the fourth surface.

Figures 7A, 7B, 7C:
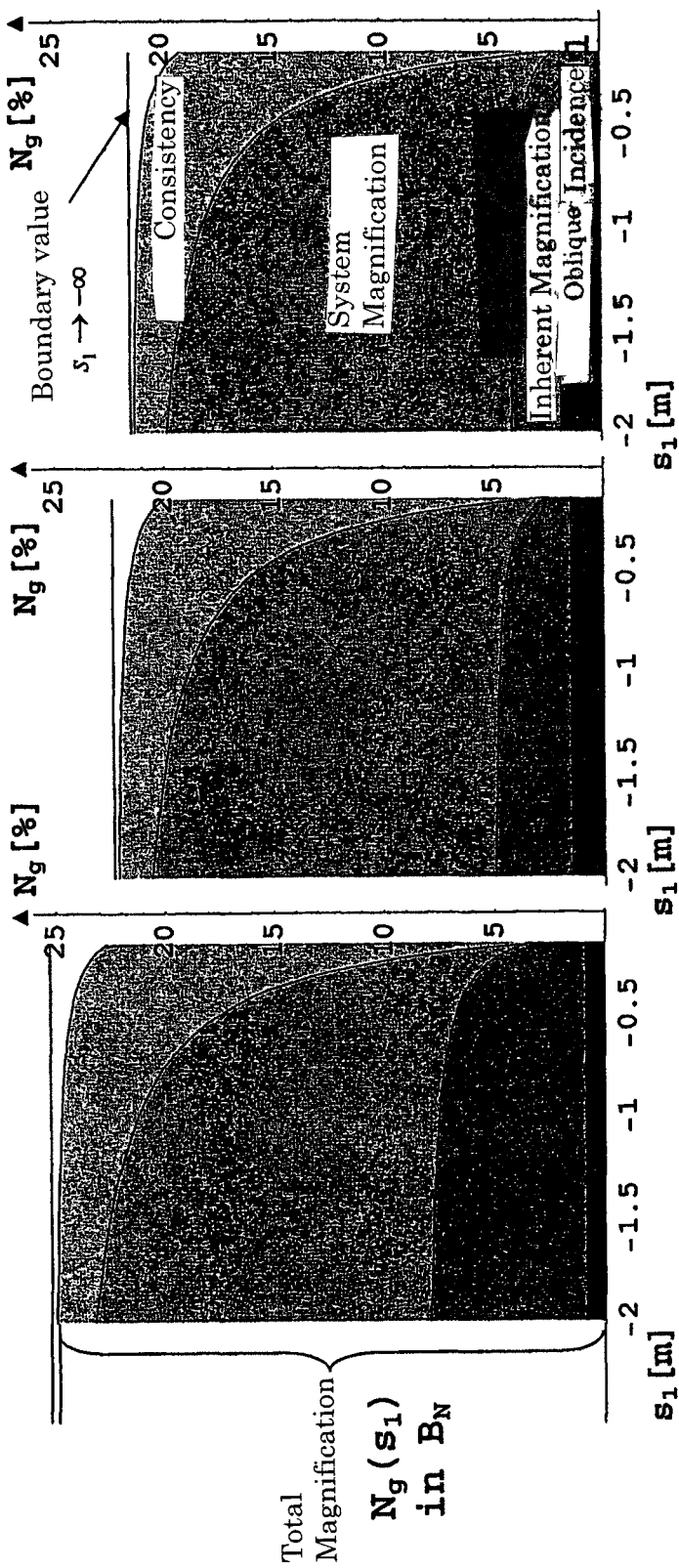
FIGS. 7a to 7c are diagrams which illustrate the influence of a finite focal length $s_1$ on the magnification of three progressive spectacle lenses in the near reference point.

FIGS. 7a to 7c show the influence of a finite focal length $s_1$ on the magnification of a progressive spectacle lens in the near reference point. FIGS. 7a to 7c relate to three different types of conventional, commercially available, progressive spectacle lenses: Progressive LIFE 1 (FIG. 7a)

Progressive LIFE 2 (FIG. 7b) and Impression ILT (FIG. 7c) of the firm Rodenstock GmbH. All progressive spectacle lenses have a spherical effect of 5.0 dpt and an addition of 2.0 dpt.

Table 2 shows the geometrical parameters of the progressive spectacle lenses illustrated in FIGS. 7a to 7c and the calculated inherent and total magnification according to the respective Formula 35 to 37 in connection with Formula 11b (analogous) for different spectacle lenses (Progressive LIFE 1, Progressive LIFE 2, Impression ILT) in the near reference point $B_N$ in percent, the limit values for the imaginary infinite object distance $s_1 \to -\infty$ being indicated.

TABLE 2

| | Progressive LIFE 1 | Progressive LIFE 2 | Impression ILT |
|---|---|---|---|
| Bending of the Front Face $D_1$ | +10.2 dpt | +9.2 dpt | +7.4 dpt |
| Center Thickness d | 10.2 mm | 5.96 mm | 4.96 mm |
| Refractive Index n | 1,502 | 1,596 | 1,597 |
| $N_e(s_1 \to -\infty)$ | 7.3% | 3.5% | 2.3% |
| $N_g(s_1 \to -\infty)$ | 25.2% | 22.2% | 21.5% |

The order of the numerical values of the total magnification $N_g(s_1)$ in the near reference point $B_N$ changes only slightly in the case of all spectacle lenses and similarly as a function of the object distance $s_1$. The division of the total magnification into system magnification $N_s(s_1)$ and shape magnification $N_e(s_1)$ loses its strict meaning in the case of a finite object distance because the fictitious quantities $N_s$ and $N_e$ match the paraxial model of the afocal system in the case of an infinite object distance. However, under general conditions, there are still additional contributions to $N_g(s_1)$ which can be assigned neither to $N_s$ nor to $N_e$, as, for example, the effect of the oblique incidence or the effect of the scaling consistency σ in the case of a finite object distance. It may nevertheless be very interesting to form, from the partial matrices $N_e(s_1)$ and $N_s(s_1)$, the Eigenvalues and the respective average values analogous to Equations (11a, b) and to then interpret the numerical values as contributions to the system magnification $N_s(s_1)$ and the shape magnification $N_e(s_1)$ These numerical values are therefore included, in addition to $N_g(s_1)$, in FIGS. 7a to 7c as a function of the object distance. By means of the bottom line "oblique incidence", the influence is indicated that is independent of the object distance and that originates from the matrices $T_i$ and is defined as the relationship $$N_{oblique\ incidence} = \frac{N_g(s_1 \to -\infty)}{N_e(s_1 \to -\infty)N_s(s_1 \to -\infty)} \quad (51)$$

The part called "consistency" in FIGS. 7a to 7c represents the remainder, specifically the function:

$$\text{Consistency}(s_1) = N_g(s_1) - N_s(s_1) - N_e(s_1) - N_{obliqueincidence} \quad (52)$$

The object distance, which is taken into account when calculating the magnification of the respective spectacle lens, is in each case entered in meters on the abscissa of FIGS. 7a to 7c. The negative preceding sign indicates object-side distances. The quantities:

$$N_{obliqueincidence} \cdot (N_{obliqueincidence} + N_e(s_1)), \\ (N_{obliqueincidence} + N_e(s_1) + N_s(s_1)), \quad (53)$$

$$(N_{obliqueincidence} + N_e(s_1) + N_s(s_1) + \text{Consistency}(s_1)) = N_g(s_1) \quad (54)$$

are entered on the respective ordinate of FIGS. 7a to 7c (in the upward direction).

Figure 8:
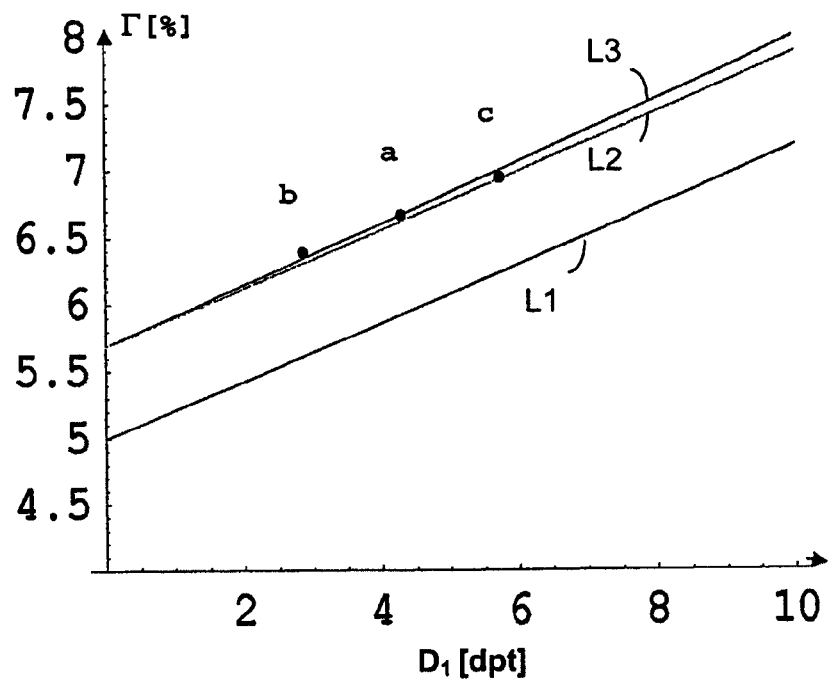
FIG. 8 is a diagram illustrating the influence of the bending of the front face on the magnification of the spectacle lens.

FIG. 8 illustrates the influence of the bending of the front face on the total magnification of the spectacle lens as a function of the used model of magnification.

Figure 9:
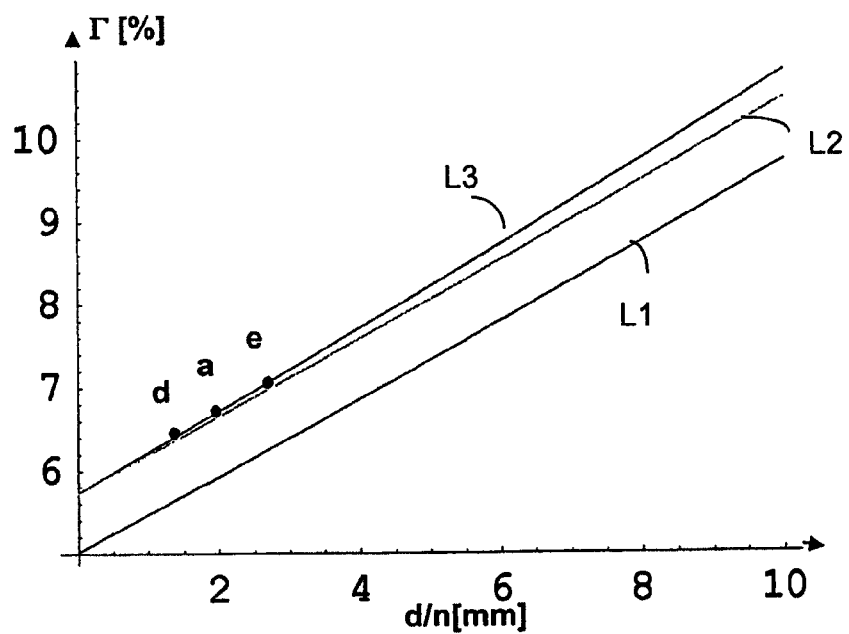
FIG. 9 is a diagram illustrating the influence of the thickness of the spectacle lens on the magnification of the spectacle lens.

FIG. 9 illustrates the influence of the center thickness of the spectacle lens on the total magnification of the spectacle lens as a function of the used model of magnification.

The spectacle lenses illustrated in FIGS. 8 and 9 are commercially available spectacle lenses of the Impression ILT type designation of the firm Rodenstock GmbH which have the following parameters: Sph=0.5dpt, Cyl=0.0dpt, Add=2.0dpt.

The bending or the surface power of the front face is entered on the abscissa in FIG. 8 in dpt. The magnification Γ is entered on the ordinate in percent (compare Formula 11b). The ratio of the center thickness of the spectacle lens to the refractive index of the spectacle lens is entered on the abscissa in FIG. 9 in mm. The magnification Γ is entered on the ordinate in percent (compare Formula 11b).

In FIGS. 8 and 9, Line L1 relates to the total magnification of the spectacle lens calculated according to the classical Formula 1. Line L2 relates to the magnification calculated according to Formula 11b in connection with Formula 16 (that is, magnification in scalar approximation). Line L3 relates to the precise expression for the magnification calculated according to Formula 11 in connection with Formula 35.

As illustrated in FIGS. 8 and 9, the magnification of the spectacle lens calculated according to the classical Formula 1, especially for higher depths of curvature of the front face or for larger center thicknesses, partly deviates considerably from the actual magnification of the spectacle lens calculated while taking into account a realistic object model. In this case, the differences between the magnification calculated by scalar approximation (Formula 16) and the magnification calculated according to the precise formula (Formula 35) are relatively small.

The magnification and/or distortion of the spectacle lens calculated according to the above formulas can be taken into account when evaluating the spectacle lens, particularly the static and dynamic seeing impression through the spectacle lens. The data of the spectacle lens to be evaluated (thickness, rise height, and/or local curvatures of the front and back face) may be theoretical data or measured data of a predetermined spectacle lens. Since the calculation of the magnification and/or distortion takes place without high computing expenditures, an evaluation of the spectacle lens while taking into account the actual local magnification and/or the local distortion can also take place in real time or on-line for complex aspherical, atoric and progressive spectacle lenses. The distribution of the local magnification and/or distortion of the spectacle lens visualized by means of isolines or color coding can be used, for example, in a supporting manner for the advising of customers by the optician or for the selection of the optimal spectacle lens (material, frame, bending, thickness, etc.). It is another advantage of the calculating and evaluating method respectively according to the invention that individual parameters of the spectacle wearer's eyes (prescription values, interpupillary distance; corneal vertex distance, etc.), of the usage position (forward tilt, frame piece angle, etc.) and/or of the object model (object distances as a function of the seeing task to be achieved) can also be taken into account when calculating the local magnification and/or distortion and evaluating the spectacle lens. As a result, the exact impression of the magnification and/or distortion felt by a concrete spectacle wearer when looking through the spectacle lens can be considered.

Likewise, the magnification and/or distortion calculated according to one of the above-mentioned formulas can be taken into account when optimizing the spectacle lens and particularly when optimizing the surfaces.

The optimization of the spectacle lens or of the surfaces of the spectacle lens takes place such that a performance function F is minimized:

$$\min F = \min\left(\sum_i G_{V,i}(N_{actual}(i) - N_{des}(i))^2 + (G_{Z,i}(Z_{actual}(i) - Z_{des}(i))^2)\right) \quad (55)$$

wherein $N_{actual}(i)$ indicates the actual magnification of the spectacle lens at the i-th evaluation point;

$N_{des}(i)$ indicates the desired magnification of the spectacle lens at the i-th evaluation point;

$G_{v,i}$ indicates the weighting of the magnification of the spectacle lens at the i-th evaluation point;

$Z_{actual}(i)$ indicates the actual distortion of the spectacle lens at the i-th evaluation point;

$Z_{des}(i)$ indicates the desired distortion at the i-th evaluation point;

$G_{z,i}$ indicates the weighting of the distortion at the i-th evaluation point.

The optimizing method may comprise several iteration steps.

In a preferred embodiment, the optimization according to the invention takes place only while taking into account the magnification or the distortion of the spectacle lens. In this case, the weighting $G_{v,i}$ of the magnification in the performance function F or the weighting $Z_{actual}(i)$ of the distortion in the performance function F is equal to zero.

In addition to the magnification and/or the distortion of the spectacle lenses, the optimization of the spectacle lens can preferably take place such that the distribution of the power or the refraction errors and/or the astigmatic errors is taken into account. The optimization with respect to refraction errors and/or astigmatic errors preferably takes place by taking into account the usage value and/or the value of the astigmatism in the usage position of the spectacle lens.

When calculating the local magnification and/or distortion of the spectacle lens as well as when optimizing the spectacle lens, average values for the characteristics of a standard eye (interpupillary distance, position of the principal planes, of the rotation point of the eye, of the entrance pupil, etc.) may be taken into account. Furthermore, the spectacle lens can be arranged in an average usage position (characterized by the side tilt and forward tilt of the spectacle lens, the corneal vertex distance, etc.). Likewise, an average model of the object to be viewed or for the object distance may be considered. The optimization of the spectacle lens preferably takes place while taking into account the distribution of the local magnification and/or distortion calculated in this model of the spectacle lens—eye system as well as preferably while taking into account the distribution of the usage value (or power of the spectacle lens in the usage position) and/or of the astigmatism of the spectacle lens in the usage position. The object of the optimization is a local change, that is as small as possible, of the magnification of the spectacle lens and/or minimal values of the distortion as well as, in addition, refraction errors and/or astigmatic errors that are as small as possible, specifically preferably relative to the usage value or astigmatism in the usage position.

A spectacle lens optimized in this manner has not only advantageous characteristics with respect to the distribution of the magnification and/or distortion but also advantageous characteristics with respect to refraction errors and astigmatic errors.

In another, particularly preferred embodiment, the calculating of the local magnification and/or of the local distortion as well as the optimizing of the spectacle lens or the surface optimizing of the spectacle lens takes place while taking into account the individual parameters of the spectacle wearer's eye (interpupillary distance, position of the principal planes, of the rotation point of the eye, of the entrance pupil, etc.) the individual usage situation in which the spectacle lens is arranged (such as the side tilt and forward tilt of the spectacle lens arranged in a spectacle frame, the corneal vertex distance, the interpupillary distance, etc.), the intended use of the spectacle lens (reading glasses, sports glasses, etc.) and/or the individual model of the object space to be viewed. The individual data may be determined, for example, by an optician when the spectacles are ordered and can be transmitted together with the prescription data of the spectacle lenses (spherical, cylindrical, prismatic and/or progressive effect) to a system according to the invention for calculating the magnification and/or distortion of the spectacle lens and/or to a system according to the invention for producing a spectacle lens, preferably by remote data transmission or on-line.

It thereby becomes possible to determine the actual magnification and/or the distortion felt by the wearer of the spectacles when looking through the spectacle lens arranged in a predetermined frame and to thus assist the selection of a certain spectacle lens and/or of a certain spectacle frame.

It is further conceivable to transmit the individual data together with the prescription data of the spectacle lens preferably by remote data transmission or on-line to a system according to the invention for producing a spectacle lens. The optimization of the spectacle lens while taking into account the distribution of the magnification and/or of the distortion (as a single or as an additional parameter) takes place on the basis of the transmitted individual data and prescription data. Preferably one of the two surfaces of the spectacle lens, which preferably is the object-side front face, is a simple rotationally symmetrical surface. The optimization of the spectacle lens comprises a surface optimizing of the opposite surface, which preferably is the eye-side back face, so that the above-mentioned performance function is minimized. The thus optimized surface, as a rule, is a surface that is not rotationally symmetrical, for example, an aspherical or an atoric surface. The spectacle lenses or spectacle lens surfaces optimized while taking into account the magnification and/or distortion can be produced from mineral glass or a plastic material, for example, by means of numerically controlled tools.

FIGS. 10a to 13b illustrate the distribution of the local magnification and of the local distortion of single-strength lenses as isolines of the same magnification or distortion in percent, the distance between two isolines amounting to 1%. The local magnification and the local distortion were in each case calculated according to Formula 11b or 12b in connection with Formula 35, in which case a main beam extending through the entrance pupil of the eye was taken into account during the calculation. In other words, the illustrated magnification and distortion is the magnification and distortion of the visual angle.

Furthermore, when calculating the magnification and distortion illustrated in FIGS. 10a to 13b, a predetermined usage situation of the spectacle lens is taken into account, which is characterized by the following parameters:

Corneal vertex distance (HAS)=15.00 mm;
Forward tilt=0.0 degrees
Frame piece angle=0.0 degrees
Interpupillary distance=63.0 mm;
Rotation point distance e of the eye=28.5 mm;
Object distance model:
FIGS. 10a,b, 11a,b, 12a,b and 13a,b: object in the infinite for all viewing directions; or
FIGS. 10 c,d and FIGS. 12 c,d: infinite object distance in the upper section of the spectacle lens changing progressively into an object distance of −2.6 dpt at x=0 mm, y=−20 mm.

All FIGS. 10a to 13b relate to a Cartesian system of coordinates which is situated tangentially with respect to the front face of the spectacle lens and whose origin is situated in the zero viewing direction in front of the eye. The x-y plane is perpendicular on the zero viewing direction; all coordinate values x and y are indicated in mm.

The spectacle lenses illustrated in FIGS. 10a-d and 11a,b have a spherical effect of −4.0 dpt (sph=−4.0 dpt), a cylindrical effect of 0.0 dpt (cyl=0.0 dpt), a prismatic effect of 0.0 cm/m, a refractive index n=1.597, a bending or curvature of the front face D1=2.0 dpt as well as a center thickness $d_M=1$; 5 mm.

Figure 11B:
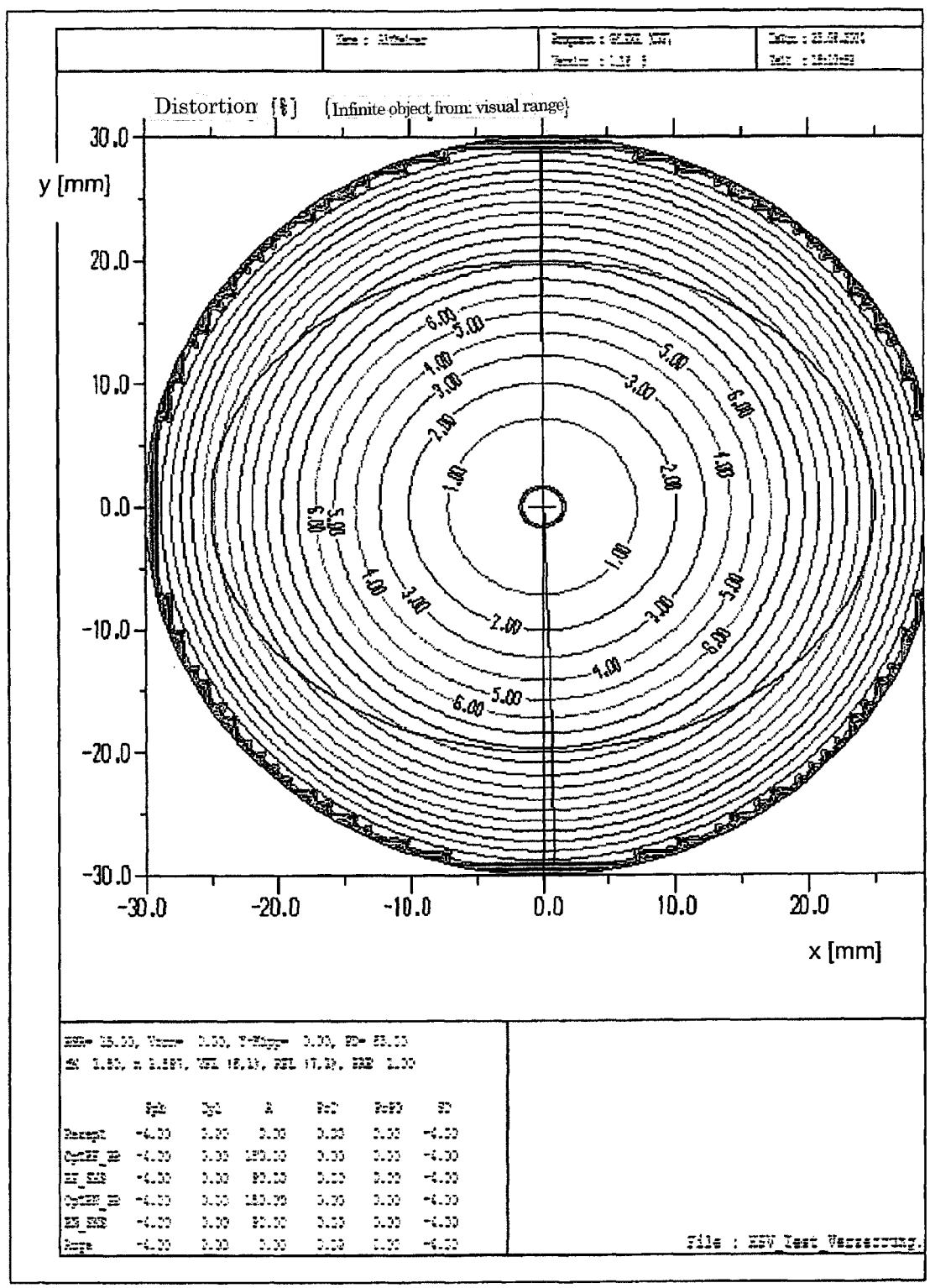

FIGS. 11a and 11b relate to a conventional single-strength spectacle lens, the back face being constructed as a spherical surface. The resulting maximally occurring distortion of this spectacle lens amounts to approximately 19% at the edge of the spectacle lens (compare FIG. 11b). The magnification of the spectacle lens in the lens center amounts to approximately −7% and in the periphery of the spectacle lens to approximately −17% (compare FIG. 11a).

FIGS. 10a to 10d relate to a single-strength spectacle lens whose back face is optimized according to an optimization method of the invention while taking into account the magnification and/or distortion of the spectacle lens, wherein an infinite object distance in all viewing directions was taken into account during the optimization of the spectacle lens.

FIGS. 10 a,b show the local magnification (in percent) and the local distortion (in percent) of this spectacle lens optimized according to the invention, which were each calculated according to Formula 11b and 12b respectively in connection with Formula 35, while taking into account an infinite object distance ($s_1 \to \infty$) in all viewing directions. FIGS. 10c,d show the local magnification (in percent) and the local distortion (in percent) respectively of the same spectacle lens optimized according to the invention, which were each calculated according to Formula 11b and 12b respectively in connection with Formula 35, while taking into account an object distance model, according to which the infinite object distance in the upper section of the spectacle lens changes progressively into an object distance of −2.6 dpt at x=0 mm, y=−20 mm.

As illustrated in FIG. 10b, the maximally occurring value of the distortion is reduced to below 4%. The magnification in the periphery of the spectacle lens reaches a value of only −2% (compare FIG. 10a).

Figure 10D:
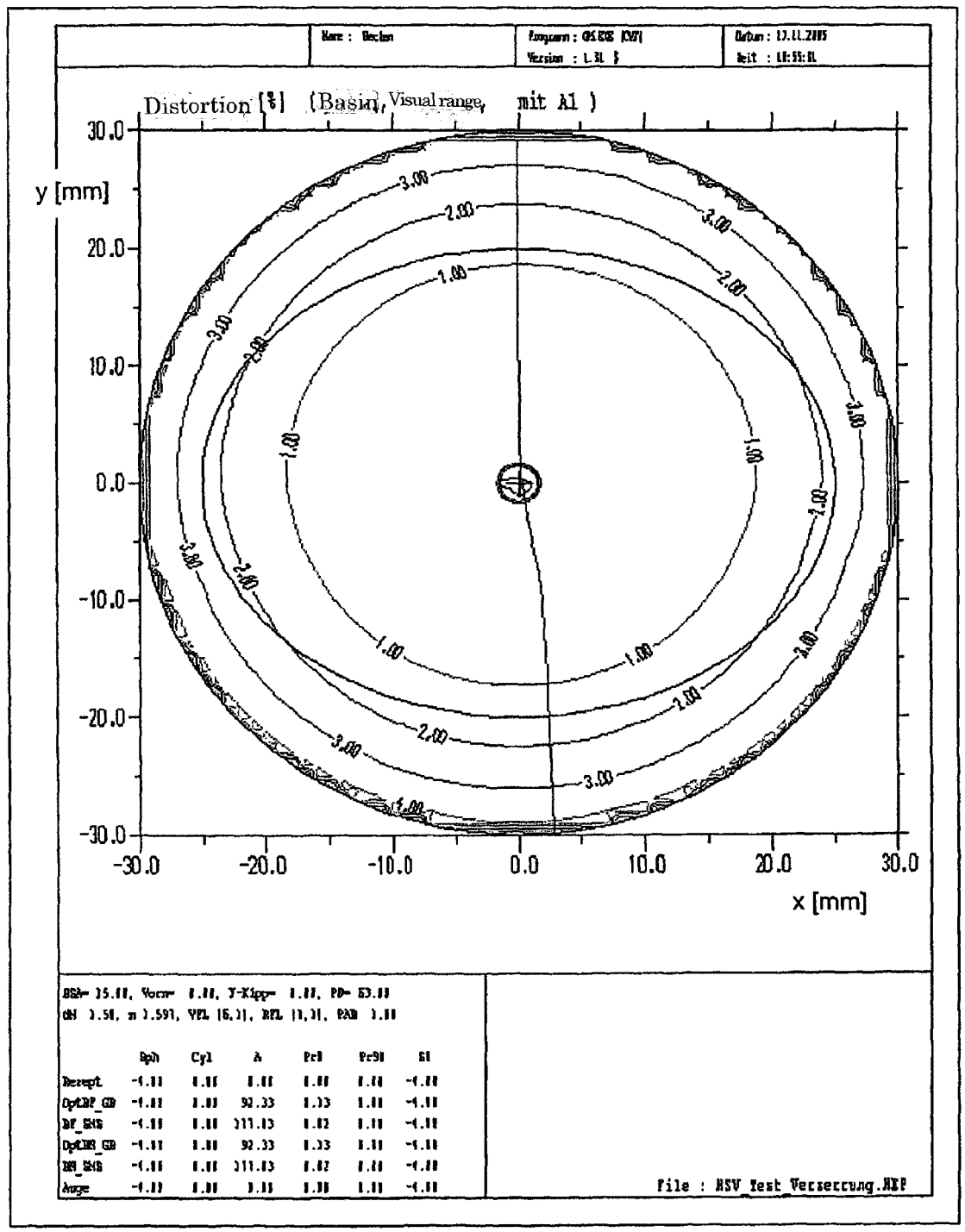

Because of the selected object distance model, which provides an infinite object distance in the upper spectacle lens region, the distributions of the local magnification and of the local distortion illustrated, on the one hand, in FIGS. 10a,b and, on the other hand, in FIGS. 10c,d are essentially identical. When comparing FIGS. 10a,b with FIGS. 10c,d, however, differences can be seen in region y<0 mm, although the maximally occurring value of the distortion in FIG. 10d is also lower than 4% (compare FIG. 10d). The magnification in the periphery of the spectacle lens reaches a value of only −1% (compare FIG. 10c).

Corresponding improvements can be achieved for single-strength spectacle lenses with a cylindrical prescription. FIGS. 12a to 13b relate to single-strength spectacle lenses with a spherical prescription of −4.0 dpt (sph=4.0 dpt) and a cylindrical prescription of 2.0 dpt with an axis of 0° (cyl=2.0 dpt, axis=0°). The single-strength spectacle lenses illustrated in FIGS. 12a to 13b also have a refractive index n=1.597, a bending or curvature of the front face D1=2.0 dpt as well as a center thickness $d_M$=1.5.

Figure 13B:
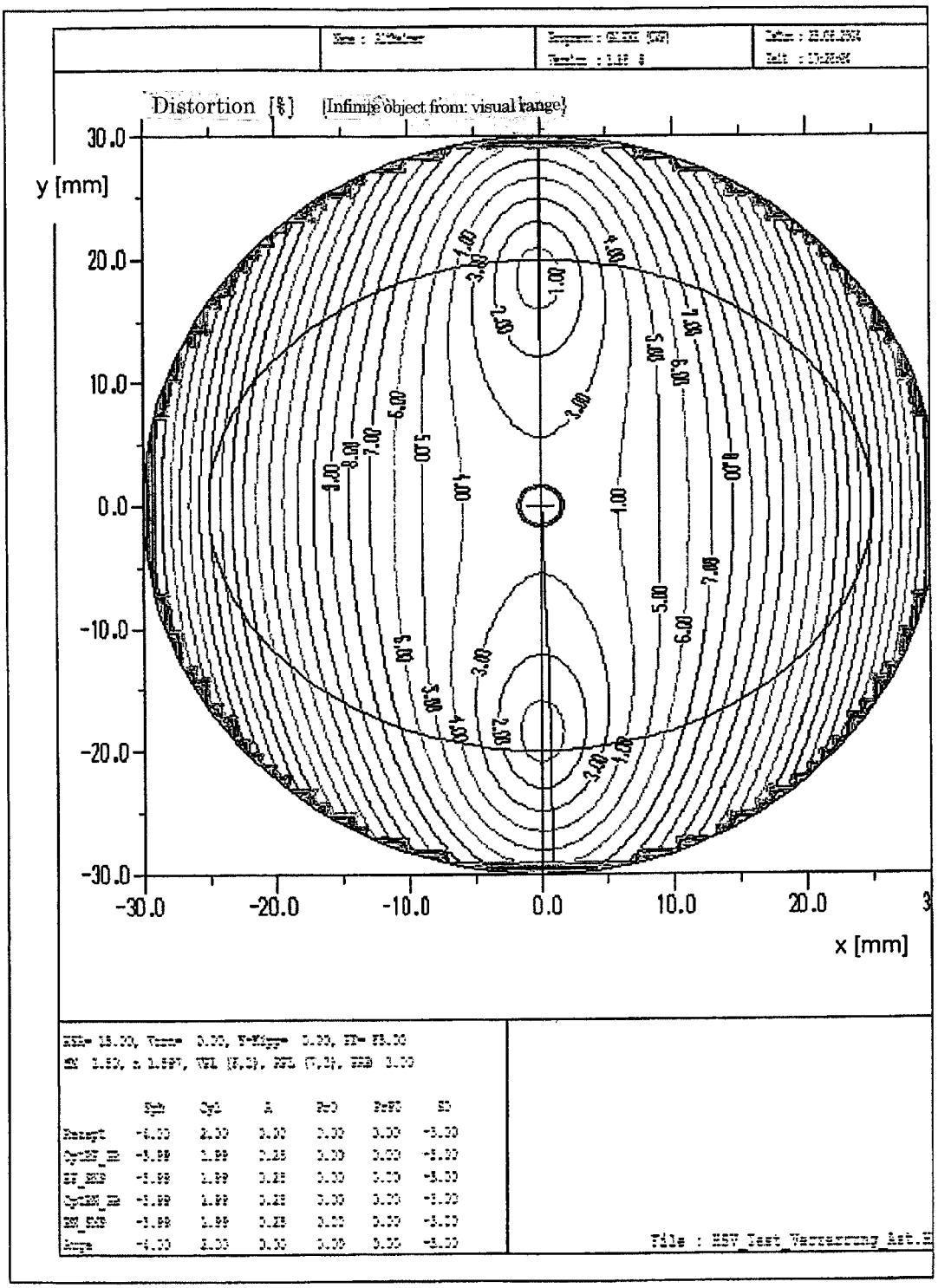

FIGS. 13a and 13b indicate the magnification in percent (FIG. 13a) and the distortion in percent (FIG. 13b) (shown as isolines of the same magnification or distortion) of a single-strength spectacle lens according to the state of the art, the back face conventionally being constructed as a toric surface. This conventional spectacle lens has distortions of up to 24% (compare FIG. 13b) and magnifications of up to −15% (compare FIG. 13a). The magnification and distortion illustrated in FIGS. 13a and 13b were calculated in the usage position of the spectacle lens while taking into account an infinite object distance in all viewing directions.

FIGS. 12a to 12d show the magnification (FIGS. 12a, 12c) and the distortion (FIGS. 12b, 12d) (illustrated as isolines of the same magnification or distortion) of a single-strength spectacle lens which had been optimized according to the invention while taking into account the distortion, during the optimization of the spectacle lens, and infinite object distance in all viewing directions having been considered.

The local magnification (in percent) and distortion (in percent) illustrated in FIGS. 12a and 12b were in each case calculated according to Formula 11b and 12b respectively in connection with formula 35, while taking into account an infinite object distance in all viewing directions. When calculating the magnification and distortion of the spectacle lens optimized according to the invention and illustrated in FIGS. 12c and 12d, an object distance model was taken into account according to which the infinite object distance in the upper section of the spectacle lens changes progressively into an object distance of −2.6 dpt at x=0 mm, y=−20 mm.

When the spectacle lens is optimized corresponding to the invention, in which case the optimization of the distortion of the spectacle lens is taken into account, the value of the maximally occurring magnification is reduced to −7% (compare FIG. 12a, FIG. 12c). The maximally occurring distortion reaches a value of only −4% (compare FIGS. 12b, 12d). Surprisingly, it was found that, although only the distortion is included in the performance function, a considerable improvement of the magnification can also be achieved. In large regions of the spectacle lens optimized according to the invention, the amount of magnification is even below 6% (compare FIG. 12a)

FIG. 14 is a schematic representation of an example of the preferred system for calculating the local magnification and/or the local distortion of a spectacle lens and for calculating or optimizing the at least one surface of the spectacle lens.

The preferred system comprises a computer system 50, having at least a first computer 100. However, the computer system 50 may optionally comprise a plurality of computers 10q, q=1, 2, . . . , which are connected with one another by a (mono-, bi- and/or multidirectional) network 300.

The computer 100 has a processor 110, a memory 120 and a bus 130. Furthermore, the computer 100 may comprise an input device 120 and/or an output device 150. The elements 110 to 170 of the computer 900 generalize the corresponding elements of the computers 101, 102, etc. The computer 100 is, for example, a conventional personal computer (PC), a multiprocessor computer, a main frame computer, a portable PC (laptop) or a stationary PC or the like.

Furthermore, a computer program product 200 is provided which is designed such that—when loaded and executed on a computer—it can implement a process for calculating the local magnification and/or the local distortion of a spectacle lens. The computer program product 200 can be stored on a physical data carrier or program carrier 210. The computer program product may also be present as a program signal.

The processor 110 of the computer 100 is, for example, a central processing unit (CPU), a micro control unit (MCU) or a digital signal processor (DSP).

The memory 120 symbolizes elements which store data and commands either in a time-limited or permanent manner. Although, for a better understanding, the memory 120 is shown as part of the computer 100, the storage function can be implemented in other locations, for example, in the processor itself (such as the cache memory, the register) and/or in the network 300, for example, in the computers 101/102. The storage device may be a read-only memory (ROM), a random access memory (RAM), a programmable or non-programmable PROM or a storage device with other accessing options. The memory 120 may be physically implemented or stored on a computer-readable program carrier, for example, on (a) a magnetic carrier (hard disk, floppy disk, magnetic tape);

(b) an optical carrier (CD-ROM, DVD);

(c) a semiconductor carrier (DRAM, SRAM, EPROM, EEPROM).

The memory 120 is optionally distributed over various media. Parts of the memory 120 may be fixedly or exchangeably mounted. For computer 100 uses known devices, such as floppy disk drives, etc., for reading and writing.

The memory 120 stores support components, such as a basic input output system (bios), an operating system (OS), a program library, a compiler, an interpreter and/or a spreadsheet processing and/or word processing program. For the purpose of clarity, these components are not shown. Support components are commercially available and can be installed on the computer 100 and/or can be implemented therein by skilled personnel.

The processor 110, the memory 120 and the input and output device are connected by way of at least one bus 130 and/or are optionally connected by way of the (mono-, bi-, or multidirectional network 300 (for example, the Internet) or are in a mutual connection. The bus 130 as well as the network 300 represent logical and/or physical connections which transmit commands as well as data signals. The signals within the computer 100 are predominantly electrical signals, whereas the signals in the network may be electrical, magnetic and/or optical signals or also wireless radio signals.

Network environments (such as the network 300) are customary in offices, business computer networks, intranets and in the Internet (that is, the World Wide Web). The physical distance between the computers in the network is insignificant. The network 300 may be a wireless or a wired network. Conceivable examples of implementations of the network 300 are as follows: a local network (LAN), a wireless local network (WLAN), a wide area network (WAN), an ISDN network, an infrared connection (IR), a radio connection, such as the Universal Mobile Telecommunication System (UMTS) or a satellite connection. Transmission protocols and data formats are known. Examples are: Transmission Control Protocol/Internet Protocol (TCP/IP), Hypertext Transfer Protocol (HTTP), Unique Resource Locator (URL), Hypertext Markup Language (HTML), Extensible Markup Language (XML), Wireless Application Markup Language (WML), Wireless Application Protocol (WAP), etc.

The input and output devices may be part of a user interface 160.

The input device 140 represents a device which provides data and instructions for processing by the computer 100. For example, the input device 140 would be a keyboard, an indicating device (mouse, track ball, cursor arrows), a microphone, a joystick, or a scanner. Although the examples all involve systems with human interaction, preferably by means of a graphic user interface, the device 140 can also function without human interaction, as, for example, a wireless receiver (for example, by means of a satellite antenna or a terrestrial antenna), a sensor (for example, a thermometer), a counter (for example, a piece number counter in a factory). The input device 140 can be used for reading the data carrier or the carrier 170.

The output device 150 is a device which indicates instructions and data that have already been processed. Examples are a monitor or another indicating device (cathode ray tube, flat screen, LCD display, loudspeaker, printer, vibration alarm). Similar to the input device 140, the output device 150 preferably communicates with the user, preferably by means of a graphic user interface. The output device can also communicate with other computers 101, 102, etc.

The input device 140 and the output device 150 can be combined in a single system. Both devices 140, 150 may be provided in an optional manner.

The computer program product 200 comprises program instructions and optionally data which, among other things, cause the processor 110 to carry out process steps of the method according to the invention or preferred embodiments thereof. In other words, the computer program 200 defines the function of the computer 100 and its interaction with the network system 300. The computer program product 200 may, for example, be present as a source code in an arbitrary programming language and/or as a binary code in a compiled form (that is, in a machine-readable form). A person skilled in the art is capable of using the computer program product 200 in connection with any of the previously explained support components (for example, the compiler, the interpreter and the operating system).

Although the computer program product 200 is shown to be stored in the memory 120, the computer program product 200 may also be stored at any other location. The computer program product 200 may also be stored on the data carrier or program carrier 170.

As an example, the data carrier 170 is shown outside the computer 100. In order to transfer the computer program product 200 to the computer 100, the data carrier 170 can be introduced into the input device 140. The data carrier 170 can be implemented as an arbitrary computer-readable carrier, such as one of the above-explained media (compare memory 120). The program signal 180, which is preferably transmitted to the computer 100 by way of the network 300, can also contain the computer program product 200 or be a part thereof.

Interfaces for coupling the individual components of the computer system 50 are also known. For the purpose of simplification, the interfaces are not shown. An interface may, for example, have a serial interface, a parallel interface, a game port, a universal serial bus (USB), an internal or external modem, a graphic adapter and/or sound card. The spectacle lenses or spectacle lens surfaces optimized while taking into account the local magnification and/or distortion can be produced, for example, from a mineral glass or a plastic material by means of numerically controlled tools.

List of Reference Symbols

| | |
|---|---|
| 10 | front-side or object-side surface of the spectacle lens |
| 12 | plane of refraction |
| 14 | less curved main section |
| 16 | more curved main section |
| 20 | back-side or eye-side or image-side surface of the spectacle lens |
| 30 | model eye |
| 40 | refracting or boundary surface |
| 50 | computer system |
| 100, 10q | computer |
| 110 | processor |
| 120 | memory |
| 130 | bus |
| 140 | input device |
| 150 | output device |
| 160 | user interface |
| 170 | data carrier |
| 180 | program signal |
| 200 | computer program product |
| 300 | network |
| S1-S3 | calculating steps |
| HS | main beam |
| NS | secondary ray |
| O | object point |
| D1 | intersection point of the main beam with the front face |
| D1' | intersection point of the secondary ray with the front face |
| D2 | intersection point of the main beam with the back face |
| Z' | rotation pointof the eye |
| P1-P4 | infinitesimally small object |

The invention claimed is:

1. A method of calculating local magnification and/or local distortion of a spectacle lens in at least one predetermined or predeterminable viewing direction, the spectacle lens being configured for correcting a refractive deficit of an eye and having at least a first object-side surface and a second eye-side surface, comprising:

calculating, by a computer, a course of a main beam for the predetermined or predeterminable viewing direction, which main beam originates from a predetermined or object point and, after refraction by the spectacle lens, passes through a rotation point of the eye, through eye entrance pupils or through an eye principal plane;

determining, by the computer, main curvatures and directions of a local wave front associated with the main beam on refraction by the spectacle lens; and calculating, by the computer, a local magnification and/or a local distortion of the spectacle lens from the determined main curvatures and local wave front directions, main beam course data and spectacle lens data.

2. The method of claim 1, wherein calculating, by the computer, the local magnification and/or the local distortion takes into account a finite distance of the object from the spectacle lens.

3. The method of claim 1, wherein at least one of the first and second surfaces is a rotationally asymmetrical surface, and the spectacle lens data comprise data with respect to rise heights and/or local curvatures of the at least one rotationally asymmetrical surface.

4. The method of claim 3, wherein the at least one rotationally asymmetrical surface is one of a progressive surface with a continuously changing refractive power between a far and a near reference point and an aspherical or atoric surface.

5. The method of claim 1, wherein the calculation of the local magnification and/or of the local distortion takes place by paraxial approximation.

6. The method of claim 1, wherein calculating, by the computer, the local magnification and/or the local distortion takes into account a non-paraxial course of the main beam.

7. The method of claim 1, wherein calculating, by the computer, the local magnification and/or the local distortion further comprises calculating, by the computer, a local magnification matrix from characteristics of the local wave front, and calculating magnification of the spectacle lens as an average value of Eigenvalues of the magnification matrix and the distortion is calculated as the difference between the Eigenvalues of the magnification matrix.

8. The method of claim 7, wherein the local magnification matrix is calculated according to following formulas set forth herein, wherein individual local factors or quantities are always evaluated at intersection points of the main beam with the respective surface of the spectacle lens, $$N_g^{-1} = \sigma \cdot N_e^{-1} N_s^{-1}$$

$$N_e^{-1} = 1 - \frac{d}{n} S_1'$$

$$N_s^{-1} = 1 - e S_2'$$

$$S_2' = S_2 + D_2$$

$$S_2 = N_e S_1'$$

$$S_1' = S_1 + D_1$$

$$S_1 = \frac{1}{s_1} 1$$

wherein:

$\sigma$ indicates a scaling factor for taking into account a finite focal length $s_1$ calculated according to the formula $$\sigma = \frac{|s_1|}{|s_1 + d + e|};$$

$s_1$ indicates a vector of a length $s_1$ in the light direction of the object-side main beam between an object viewed in a predetermined viewing direction and the intersection point (D1) of the main beam with the first surface, d indicates a vector of the length d in the light direction of the main beam between the intersection point (D1) of the main beam with the first surface and the intersection point (D2) of the main beam with the second surface, e indicates a vector of a length e in the light direction of the image-side main beam between the intersection point (D2) of the main beam with the second surface and the eye entrance pupil, eye the rotation point (Z') or the eye principal plane of the eye, n indicates the refractive index of the spectacle lens, $N_e^{-1}$ indicates the local inverse matrix of the inherent magnification, $N_s^{-1}$ indicates the local inverse matrix of the system magnification, $S_i$, i=1, 2 indicates the local curvature matrix of the incident spherical wave front on the i-th surface of the spectacle lens, $S'_i$, i=1, 2 indicates the local curvature matrix of the wave front after the refraction on the i-th surface of the spectacle lens, $D_i$, i=1, 2 indicates the local surface power matrix of the i-th surface of the spectacle lens which is calculated according to the formulas $$D_i = \begin{pmatrix} Sph_i - \frac{Zyl_i}{2}\cos 2\psi_i & -\frac{Zyl_i}{2}\sin 2\psi_i \\ \frac{Zyl_i}{2}\sin 2\psi_i & Sph_i + \frac{Zyl_i}{2}\cos 2\psi_i \end{pmatrix}$$

$$Sph_i = \frac{(n-1)}{2}\left(\frac{1}{r_i^a} - \frac{1}{r_i^b}\right)$$

$$Zyl_i = \frac{(n-1)}{2}\left(\frac{1}{r_i^a} - \frac{1}{r_i^b}\right),$$

$i = 1, 2;$ wherein $r_i^{a,b}$, i=1, 2 indicate the local main curvature radii of the i-th surface in the respective main beam intersection point (D1, D2) beam with the i-th surface of the spectacle lens, and $\Psi_i$ indicates the angle between the normal vector $p_i$ of the refraction plane at the i-th surface and the direction ($q_i$) in which the more curved main section extends.

9. The method of claim 8, wherein the local magnification matrix, the local inverse matrix of the inherent magnification, the local inverse matrix of the system magnification, the local curvature or vergency matrix of the incident spherical wave front on the first surface of the spectacle lens, the local curvature or vergency matrix of the wave front after the refraction at the i-th surface of the spectacle lens $S'_i$, i=1, 2 and the local curvature or vergency matrix $S_2$ of the wave front incident on the second surface of the spectacle lens are proportional to the unit matrix.

10. The method of claim 7, wherein the magnification matrix is calculated according to the following formulas, wherein the individual local factors or quantities are always evaluated at the main beam intersection points (D1, D2) with the respective surface of the spectacle lens, $$N_g^{-1} = \sigma \cdot R_1^{-1} T_1^{-1} N_e^{-1} R_{12} T_2^{-1} N_s^{-1} R_2$$

$$N_e^{-1} = 1 - \frac{d}{n} S_1'$$

$$N_s^{-1} = 1 - e S_2',$$

wherein:

σ indicates a scaling factor for taking into account a finite focal length $s_i$ calculated according to the formula $$\sigma = \frac{|s_1|}{|s_1 + d + e|};$$

$s_1$ indicates a vector of a length $s_1$ in the light direction of the object-side main beam between the object viewed in a predetermined viewing direction and the main beam intersection point (D1) with the first surface, d indicates a vector of the length $d_1$ in the light direction of the main beam between the main beam intersection point (D1) with the first surface and the main beam intersection point (D2) with the second surface, e indicates a vector of a length e in the light direction of the image-side main beam between the main beam intersection point (D2) with the second surface and the eye entrance pupil, the eye rotation point (Z') or the eye principal plane, n indicates the refractive index of the spectacle lens, $N_e^{-1}$ indicates the local inverse matrix of the inherent magnification, $N_s^{-1}$ indicates the local inverse matrix of the system magnification, and wherein

| | |
|---|---|
| $R_1 = R(\phi_1) = \begin{pmatrix} \cos\phi_1 & -\sin\phi_1 \\ \sin\phi_1 & \cos\phi_1 \end{pmatrix}$ | indicates the 2 × 2 rotation matrix within the plane perpendicular to the object-side main beam $s_1$ from the system of the first surface, defined by the normal vector $p_1$ perpendicular to the plane of refraction at the first surface, onto a suitable reference direction defined by the reference direction vector $p_0$ |
| $\phi_1$ | indicates the angle between the normal vector $p_1$ and the reference direction vector $p_0$ |
| $R_2 = R(\phi_2) = \begin{pmatrix} \cos\phi_2 & -\sin\phi_2 \\ \sin\phi_2 & \cos\phi_2 \end{pmatrix}$ | indicates the 2 × 2 rotation matrix within the plane perpendicular to the object-side main beam e from the system of the second surface, defined by the normal vector $p_2$ perpendicular to the plane of refraction at the second surface, onto a suitable reference direction $p_0$ |
| $\phi_2$ | indicates the angle between the normal vector $p_2$ and the reference direction vector $p_0$ |
| $R_{12} = R(\phi_{12}) = \begin{pmatrix} \cos\phi_{12} & -\sin\phi_{12} \\ \sin\phi_{12} & \cos\phi_{12} \end{pmatrix}$ | indicates the 2 × 2 rotation matrix within the plane perpendicular to the main beam d between the surfaces of the spectacle lens, which transforms the normal vector $p_1$ into the normal vector $p_2$ |
| $\phi_{12}$ | indicates the angle between the normal vectors $p_1$ and $p_2$; |
| $T_i = C_i C_i'^{-1}, i = 1, 2$ $C_i = \begin{pmatrix} \cos\alpha_i & 0 \\ 0 & 1 \end{pmatrix}, i = 1, 2$ $C_i' = \begin{pmatrix} \cos\alpha_i' & 0 \\ 0 & 1 \end{pmatrix}, i = 1, 2$ | indicate the 2 × 2 slope matrices for taking into account the influence that a oblique incidence of the main beam at the i-th surface of the spectacle lens has on the magnification; |
| $\alpha_i$ | indicates the incidence angle at the i-th surface of the spectacle lens, defined as the angle between the vector along main beam emerging from the i-th surface and the normal vector $n_i$, $i = 1, 2$ perpendicular to the i-th surface of the spectacle lens |
| $\alpha_i'$ | indicates the angle of reflection at the i-th surface of the spectacle lens, defined as the angle between the vector along the main beam emerging from the i-th surface and the spectacle lens and the normal vector $n_i$, $i = 1, 2$ perpendicular to the i-th surface of the spectacle lens |
| $S_1 = \frac{1}{s_1} 1$ | indicates the curvature or vergency matrix of the spherical wave front incident on the first surface |
| $S_i' = T_i S_i T_i + \tilde{D}_i$ | indicates the local curvature or vergency matrices of the wave fronts after the refraction at the i-th surface of the spectacle lens, calculated according to the law of refraction while taking into account a main beam oblique angle of incidence |
| $S_2 = R_{12}^{-1} N_e S_1' R_{12}$ | indicates the local curvature or vergency matrix of the wave front incident on the second surface which is calculated after the transfer from the first surface |
| $\tilde{D}_i = v_i C_i'^{-1} D_i C_i'^{-1}$ | indicates the corrected local surface power matrix of the i-th surface of the spectacle lens, which takes into account a non-paraxial incidence of the wave front |
| $D_i = \begin{pmatrix} Sph_i - \frac{Zyl_i}{2}\cos 2\psi_i & -\frac{Zyl_i}{2}\sin 2\psi_i \\ -\frac{Zyl_i}{2}\sin 2\psi_i & Sph_i + \frac{Zyl_i}{2}\cos 2\psi_i \end{pmatrix}$ | indicates the local surface power matrix of the i-th surface of the spectacle lens |
| $\psi_i$ | indicates the angle between the normal vector $p_i$ of the refraction plane at the i-th surface of the spectacle lens and the direction $q_i$ into which the more curved main section extends |

-continued

| | |
|---|---|
| $Sph_i = \frac{(n-1)}{2}\left(\frac{1}{r_i^a} + \frac{1}{r_i^b}\right), i = 1, 2$ | indicates the spherical equivalent of the i-th surface of the spectacle lens |
| $Zyl_i = \frac{(n-1)}{2}\left(\frac{1}{r_i^a} - \frac{1}{r_i^b}\right), i = 1, 2$ | indicates the cylinder of the i-th surface of the spectacle lens |
| $r_i^{a,b}, i = 1, 2$ | indicates the main curvature radii of the i-th surface of the spectacle lens |
| $v_1 = \frac{n\cos\alpha_1' - \cos\alpha_1}{n-1}$ | indicates the correction factor for taking into account the main beam oblique angle of incidence at the first surface (20). |
| $v_2 = \frac{\cos\alpha_2' - n\cos\alpha_2}{1-n}$ | indicates the correction factor for taking into account the main beam oblique angle of incidence at the second surface. |

11. The method of claim 1, wherein the local magnification and/or distortion of the spectacle lens is determined for a plurality of predetermined or predeterminable viewing directions.

12. The method of claim 1, further comprising:
collecting, by the computer, data relating to the spectacle lens, particularly data concerning a thickness, rising heights of a front face and a back face of the spectacle lens and/or a local curvatures of the front face and back face of the spectacle lens.

13. A computer program product comprising a non-transitory processor readable storage medium having processor executable code embodied therein that is designed, when loaded and executed on a computer, for implementing the method of calculating local magnification and/or local distortion of a spectacle lens in at least one predetermined or predeterminable viewing direction, the spectacle lens being configured for correcting a refractive deficit of an eye and having at least a first object-side surface and a second eye-side surface, comprising:
calculating a course of a main beam for the predetermined or predeterminable viewing direction, which main beam originates from a predetermined or object point and, after refraction by the spectacle lens, passes through a rotation point of the eye, through eye entrance pupils or through an eye principal plane;
determining main curvatures and directions of a local wave front associated with the main beam on refraction by the spectacle lens; and
calculating a local magnification and/or a local distortion of the spectacle lens from the determined main curvatures and local wave front directions, main beam course data and spectacle lens data.

14. A non-transitory data carrier medium having a computer program stored thereon, wherein the computer program is designed, when loaded and executed on a computer, to carry out the method of calculating local magnification and/or local distortion of a spectacle lens in at least one predetermined or predeterminable viewing direction, the spectacle lens being configured for correcting a refractive deficit of an eye and having at least a first object-side surface and a second eye-side surface, comprising:
calculating a course of a main beam for the predetermined or predeterminable viewing direction, which main beam originates from a predetermined or object point and, after refraction by the spectacle lens, passes through a rotation point of the eye, through eye entrance pupils or through an eye principal plane;
determining main curvatures and directions of a local wave front associated with the main beam on refraction by the spectacle lens; and
calculating a local magnification and/or a local distortion of the spectacle lens from the determined main curvatures and local wave front directions, main beam course data and spectacle lens data.

15. A system for calculating a local magnification and/or a local distortion of a spectacle lens in at least one predetermined or predeterminable viewing direction, the spectacle lens being designed for correcting a refraction deficit of an eye and having at least a first object-side surface and a second eye-side surface, comprising:
collecting devices for the collection of data relative to the spectacle lens;
calculating devices for calculating by means of the data relative to the spectacle lens the course of a main beam for the predetermined or predeterminable viewing direction, the main beam originating from a predetermined or object point and, after the refraction by the spectacle lens, extending through the rotation point of the eye, through the entrance pupil of the eye or through the principal plane of the eye;
calculating devices for calculating the main curvatures and directions of a local wave front pertaining to the main beam during the refraction by the spectacle lens; and
calculating devices for calculating the local magnification and/or the local distortion of the spectacle lens from the determined main curvatures and directions of the local wave front, the data of the course of the main beam, and the data relative to the spectacle lens.

16. A method of calculating local magnification and/or local distortion of a spectacle lens in at least one predetermined or predeterminable viewing direction, the spectacle lens being configured for correcting a refractive deficit of an eye and having at least a first object-side surface and a second eye-side surface, comprising:
calculating, by a computer, a course of a main beam for the predetermined or predeterminable viewing direction, which main beam originates from a predetermined or object point and, after refraction by the spectacle lens, passes through a rotation point of the eye, through eye entrance pupils or through an eye principal plane,
determining, by the computer, main curvatures and directions of a local wave front associated with the main beam on refraction by the spectacle lens;
calculating, by the computer, a local magnification and/or a local distortion of the spectacle lens from the determined main curvatures and local wave front directions, main beam course data and spectacle lens data; and
minimizing, by the computer, a performance function F, wherein $$\min F = \min\left(\sum_i G_{V,i}(N_{actual}(i) - N_{des}(i))^2 + (G_{Z,i}(Z_{actual}(i) - Z_{des}(i))^2)\right),$$

and wherein
$N_{actual}(i)$ indicates the actual magnification of the spectacle lens at the i-th evaluation point
$N_{des}(i)$ indicates the desired magnification of the spectacle lens at the i-th evaluation point
$G_{v,i}$ indicates the weighting of the magnification of the spectacle lens at the i-th evaluation point
$Z_{actual}(i)$ indicates the actual distortion of the spectacle lens at the i-th evaluation point $Z_{des}(i)$ indicates the desired distortion at the i-th evaluation point, and $G_{v,i}$ indicates the weighting of the distortion at the i-th evaluation point.

17. The method of claim 16, wherein the weighting $G_{v,i}$ of the magnification in the performance function F or the weighting $G_{z,i}$ of the distortion in the performance function F is equal to zero.

18. The method of claim 16, wherein the calculation or optimization step takes place such that additionally the refraction errors and/or the astigmatic error of the spectacle lens are minimized.

19. A computer program product comprising a non-transitory processor readable storage medium having processor executable code embodied therein that is designed, when loaded and executed on a computer, for implementing a method of optimizing a spectacle lens while taking into account a magnification and/or a distortion of the spectacle lens, the method for the optimization of the spectacle lens comprising a calculation or optimization step which takes place such that the performance function F is minimized, $$\min F = \min\left(\sum_i G_{V,i}(N_{actual}(i) - N_{des}(i))^2 + (G_{Z,i}(Z_{actual}(i) - Z_{des}(i))^2)\right),$$

wherein
- $N_{actual}(i)$ indicates the actual magnification of the spectacle lens at the i-th evaluation point,
- $N_{des}(i)$ indicates the desired magnification of the spectacle lens at the i-th evaluation point,
- $G_{v,i}$ indicates the weighting of the magnification of the spectacle lens at the i-th evaluation point,
- $Z_{actual}(i)$ indicates the actual distortion of the spectacle lens at the i-th evaluation point,
- $Z_{des}(i)$ indicates the desired distortion at the i-th evaluation point,
- $G_{z,i}$ indicates the weighting of the distortion at the i-th evaluation point.

20. A non-transitory data carrier medium having a computer program stored thereon, wherein the computer program is designed, when loaded and executed on a computer, for implementing a method of optimizing a spectacle lens while taking into account the magnification and/or the distortion of the spectacle lens, the method of optimizing the spectacle lens comprising a calculating or optimizing step, the calculating or optimization step taking place such that a performance function F is minimized, wherein $$\min F = \min\left(\sum_i G_{V,i}(N_{actual}(i) - N_{des}(i))^2 + (G_{Z,i}(Z_{actual}(i) - Z_{des}(i))^2)\right),$$

and wherein
- $N_{actual}(i)$ indicates the actual magnification of the spectacle lens at the i-th evaluation point,
- $N_{des}(i)$ indicates the desired magnification of the spectacle lens at the i-th evaluation point,
- $G_{v,i}$ indicates the weighting of the magnification of the spectacle lens at the i-th evaluation point,
- $Z_{actual}(i)$ indicates the actual distortion of the spectacle lens at the i-th evaluation point,
- $Z_{des}(i)$ indicates the desired distortion at the i-th evaluation point,
- $G_{v,i}$ indicates the weighting of the distortion at the i-th evaluation point.

21. A system for producing a spectacle lens while taking into account a magnification and/or a distortion of the spectacle lens, which is designed for correcting a refraction deficit of an eye and has at least a first object-side and a second eye-side surface, wherein the system comprises:
- collecting devices for collecting target data of a spectacle lens; and
- calculating and optimizing devices for calculating and optimizing at least one surface of the spectacle lens, the calculation and optimization respectively taking place such that a performance function F is minimized, wherein $$\min F = \min\left(\sum_i G_{V,i}(N_{actual}(i) - N_{des}(i))^2 + (G_{Z,i}(Z_{actual}(i) - Z_{des}(i))^2)\right),$$

and wherein
- $N_{actual}(i)$ indicates the actual magnification of the spectacle lens at the i-th evaluation point,
- $N_{des}(i)$ indicates the desired magnification of the spectacle lens at the i-th evaluation point,
- $G_{v,i}$ indicates the weighting of the magnification of the spectacle lens at the i-th evaluation point,
- $Z_{actual}(i)$ indicates the actual distortion of the spectacle lens at the i-th evaluation point,
- $Z_{des}(i)$ indicates the desired distortion at the i-th evaluation point,
- $G_{z,i}$ indicates the weighting of the distortion at the i-th evaluation point.

* * * * *